US012753372B2

(12) United States Patent
Kuhse et al.

(10) Patent No.: US 12,753,372 B2
(45) Date of Patent: Oct. 6, 2026

(54) COMPOSITIONS COMPRISING BLEACHING CATALYST, MANUFACTURING PROCESS THEREOF, AND BLEACHING AND CLEANING AGENT COMPRISING SAME

(71) Applicant: Catexel GmbH, Wiesbaden (DE)

(72) Inventors: Bo Kuhse, Grossdietwil (CH); Judith Preuschen, Sörgenloch (DE); Stefan Riegelbeck, Frankfurt am Main (DE); Rolf Ludwig, Eppstein (DE); Yfranka Roelofsen, Leiden (NL); Ronald Hage, Leiden (NL)

(73) Assignee: Catexel GmbH, Wiesbaden (DE)

( * ) Notice: Subject to any disclaimer, the term of this patent is extended or adjusted under 35 U.S.C. 154(b) by 493 days.

(21) Appl. No.: 18/025,921

(22) PCT Filed: Sep. 1, 2021

(86) PCT No.: PCT/EP2021/000104
§ 371 (c)(1),
(2) Date: Mar. 13, 2023

(87) PCT Pub. No.: WO2022/058039
PCT Pub. Date: Mar. 24, 2022

(65) Prior Publication Data

US 2023/0365899 A1 Nov. 16, 2023

(30) Foreign Application Priority Data

Sep. 15, 2020 (EP) .................................... 20000330

(51) Int. Cl.

| | |
|---|---|
| ***C11D 3/395*** | (2006.01) |
| ***C11D 3/04*** | (2006.01) |
| ***C11D 3/10*** | (2006.01) |
| ***C11D 3/20*** | (2006.01) |
| ***C11D 3/22*** | (2006.01) |
| ***C11D 3/37*** | (2006.01) |
| ***C11D 3/39*** | (2006.01) |
| ***C11D 11/00*** | (2006.01) |

(52) U.S. Cl.
CPC ............ *C11D 3/3932* (2013.01); *C11D 3/046* (2013.01); *C11D 3/10* (2013.01); *C11D 3/2086* (2013.01); *C11D 3/222* (2013.01); *C11D 3/3753* (2013.01); *C11D 3/3917* (2013.01); *C11D 3/3935* (2013.01); *C11D 3/3942* (2013.01); *C11D 11/0082* (2013.01); *C11D 2111/12* (2024.01); *C11D 2111/14* (2024.01)

(58) Field of Classification Search
None
See application file for complete search history.

(56) References Cited

U.S. PATENT DOCUMENTS

| | | | | |
|---|---|---|---|---|
| 1,246,339 | A | | 11/1917 | Smit |
| 2,955,905 | A | | 10/1960 | Daniel et al. |
| 3,163,606 | A | | 12/1964 | Viveen et al. |
| 3,332,882 | A | | 7/1967 | Blumbergs et al. |
| 4,128,494 | A | | 12/1978 | Schirmann et al. |
| 4,412,934 | A | | 11/1983 | Chung et al. |
| 4,536,314 | A | | 8/1985 | Hardy et al. |
| 4,675,393 | A | | 6/1987 | Coxon |
| 4,681,695 | A | | 7/1987 | Divo |
| 4,711,748 | A | * | 12/1987 | Irwin .................. C11D 3/3932 264/117 |
| 5,082,988 | A | | 1/1992 | Holtermann |
| 5,194,416 | A | | 3/1993 | Jureller et al. |
| 5,246,621 | A | | 9/1993 | Favre et al. |
| 5,314,635 | A | | 5/1994 | Hage et al. |
| 5,356,554 | A | | 10/1994 | Delwel et al. |
| 6,432,900 | B1 | | 8/2002 | Appel et al. |
| 6,579,839 | B2 | | 6/2003 | Price et al. |
| 2002/0198127 | A1 | | 12/2002 | Adriaanse et al. |
| 2003/0162681 | A1 | | 8/2003 | Hage et al. |
| 2004/0014625 | A1 | | 1/2004 | Comba et al. |
| 2005/0181964 | A1 | | 8/2005 | Jonas et al. |
| 2005/0209120 | A1 | | 9/2005 | Reinhardt et al. |
| 2012/0302490 | A1 | | 11/2012 | Reinhardt et al. |

(Continued)

FOREIGN PATENT DOCUMENTS

| | | | |
|---|---|---|---|
| AU | 631143 | B2 | 11/1992 |
| CA | 1270717 | A | 6/1990 |
| CA | 2085720 | A1 | 6/1993 |

(Continued)

OTHER PUBLICATIONS

European Search Report for EP Patent Application No. 20000330.9, Issued on Mar. 11, 2021, 12 pages.
International Preliminary Report on Patentability received for PCT Patent Application No. PCT/EP2021/000104, mailed on Jan. 23, 2023, 8 pages.
International Search Report and Written Opinion received for PCT Patent Application No. PCT/EP2021/000104, mailed on Dec. 10, 2021, 15 pages.

*Primary Examiner* — Lorna M Douyon
(74) *Attorney, Agent, or Firm* — Faegre Drinker Biddle & Reath LLP

(57) ABSTRACT

The present invention concerns a composition comprising manganese containing catalyst salts, a water-soluble polymer and a polysaccharide absorbent. The invention also concerns a method of making such compositions, preferably in the form of a granule, and bleaching formulations comprising the salt and a peroxy compound or precursor thereof. The catalyst salt containing composition and formulations comprising it, are suitable for use in catalysing oxidation, for example as a component of a laundry or dishwasher bleaching composition. The invention further relates to cleaning agents comprising the compositions described herein.

14 Claims, 3 Drawing Sheets

(56) References Cited

U.S. PATENT DOCUMENTS

2017/0145353 A1 5/2017 Shang et al.
2019/0010428 A1* 1/2019 Tillmann ........... C11D 17/0039

FOREIGN PATENT DOCUMENTS

EP 0120591 A1 10/1984
EP 0174132 A2 3/1986
EP 0185522 A2 6/1986
EP 0384070 A2 8/1990
EP 0458397 A2 11/1991
EP 0485397 A1 5/1992
EP 0544440 A2 6/1993
EP 0544519 A2 6/1993
EP 0549271 A1 6/1993
EP 0549272 A1 6/1993
EP 1557457 A1 7/2005
EP 2228429 A1 9/2010
EP 2966161 A1 1/2016
EP 3167036 B1 3/2019
GB 0836988 A8 6/1960
GB 0864798 A 4/1961
GB 0907356 A 10/1962
GB 1003310 A 9/1965
GB 1519351 A 7/1978
WO 94/21777 A1 9/1994
WO 95/06710 A1 3/1995
WO 95/06711 A1 3/1995
WO 95/07972 A1 3/1995
WO 95/30733 A1 11/1995
WO 97/48787 A1 12/1997
WO 00/12667 A1 3/2000
WO 00/34427 A1 6/2000
WO 02/68574 A1 9/2002
WO 03/72690 A1 9/2003
WO 2003/104234 A1 12/2003
WO 2006/125517 A1 11/2006
WO 2011/006934 A1 1/2011
WO 2011/066934 A1 6/2011
WO 2011/066935 A2 6/2011
WO 2011/106906 A1 9/2011
WO 2012/012494 A1 1/2012
WO 2012/048951 A1 4/2012
WO 2012/071153 A1 5/2012
WO 2014/202954 A1 12/2014
WO 2016/005261 A1 1/2016
WO 2016/177439 A1 11/2016
WO 2017/118543 A1 7/2017
WO 2017/153528 A1 9/2017
WO 2018/011596 A1 1/2018
WO 2018/210442 A1 11/2018

* cited by examiner

COMPOSITIONS COMPRISING BLEACHING CATALYST, MANUFACTURING PROCESS THEREOF, AND BLEACHING AND CLEANING AGENT COMPRISING SAME

CROSS-REFERENCE TO RELATED APPLICATIONS

This application is a National stage application (under 35 U.S.C. § 371) of PCT/EP2021/000104, filed Sep. 1, 2021, which claims benefit of European Application No. 20000330.9, filed Sep. 15, 2020, both of which are incorporated herein by reference in their entirety.

FIELD OF THE INVENTION

The present invention concerns compositions that comprise a water-soluble polymer, an absorbent and a selected water-soluble bleaching catalyst, preferable a mononuclear or dinuclear Mn(III) and/or Mn(IV) complex based on cyclic triamine ligands, which compositions are prepared by dosing a solution of said water-soluble bleaching catalyst as a solution to said water soluble polymer, absorbent and optionally other ingredients. The invention also concerns granules comprising such compositions and bleaching formulations comprising said compositions or granules and a peroxy compound. The compositions and bleaching formulations comprising it are suitable for use in catalysing oxidation, for example as a component of a laundry or dishwasher bleaching composition. The invention further relates to methods of oxidising with the bleaching formulations described herein.

BACKGROUND

Transition metal complexes, such as manganese catalysts based on triazacyclononane ligands are known to be active catalysts in the bleaching of stains in laundry detergent products and in dishwash products and for treatment of cellulosic substrates in e.g. wood-pulp or raw cotton (see for example EP 0 458 397 A2 (Unilever NV and Unilever plc) and WO 2006/125517 A1 (Unilever plc et al.).

Since these catalysts are very effective, only small amounts of them need to be used in bleaching detergent or dishwash formulations, often at levels less than 0.1 wt % in the detergent or dishwasher formulation. A difficulty arising from the use of such low dosing is achieving accurate dosing of the catalyst and homogeneous distribution throughout the formulation. When distribution of the catalyst is heterogeneous in a formulation, the use of such detergent formulations in a washing machine or in handwashing can lead to underdosing (i.e. giving a poorer bleaching performance) or overdosing of the catalyst (i.e. giving rise to excessive hydrogen peroxide decomposition and possibly brown spotting).

A well-known approach to circumvent this potential problem is the presentation/inclusion of the solid catalyst on a solid support in bleaching formulations.

For example, there is described in EP 0 544 440 A2 (Unilever plc and Unilever N.V.) the provision of a bleaching catalyst composition in the form of non-friable composite granules comprising a manganese complex catalyst; a binding agent selected from water-soluble and non-oxidisable polymers, alkali metal silicates, fatty acid/soap mixtures and mixtures thereof; and optionally an inert salt, such as a chloride- or carbonate-containing salt. Preferred salts described are hexafluorophosphate ($PF_6^-$) salts and there is described the granulation of a mixture of unsieved light soda ash and a dinuclear manganese catalyst hexafluorophosphate salt with alkaline sodium silicate solution.

WO 94/21777 A1 (Unilever N.V. and Unilever plc) describes the formation of granules comprising a dinuclear manganese complex, typically as a $PF_6^-$ salt; a carrier material, selected from zeolite, alkali metal sulphate, citric acid, succinic acid and starch; and a binding agent selected from water-soluble non-oxidisable polymers, alkali metal silicates, saturated fatty acids fatty acid soaps and mixtures thereof.

Additionally, WO 95/06710 A1 and WO 95/06711 A1 (both Unilever plc and Unilever N.V.) describe non-friable granules comprising of a manganese complex catalyst, and either a water-soluble binding agent and an inert solid or a hydrophobic binding agent and a non-deliquescent or non-hygroscopic soluble core material.

WO 95/30733 A1 (Unilever N.V. and Unilever plc) describes a bleaching composition comprising the adsorption product of a porous material with active ionic sites and a manganese complex catalyst. Porous materials described include silicas, zeolites, natural silicates and clays. The use of silica gels is recommended, in particular hydrothermally treated hydrogels. Those of the so-called S- and G-types of described as particularly preferred.

WO2014/202954 A1 (Chemsenti Limited) describes manganese catalysts containing silicate as counterion, which can be included in peroxy bleach-containing detergent formulations.

WO 2012/012494 A1 (Procter & Gamble) discloses particles with a plurality of coatings. The core of this material may contain a metal catalyst, such as a manganese complex which is not necessarily a ion. The most preferred manganese compound in this document is a complex [$LMnCl_2$), whereby L is a crossbridged tetraazacyclic ligand. In this case, the chloride anions are bound to the Mn ion. Therefore, the complex is neutral and is not a water-soluble transition-metal ion.

WO2018/011596 (Itaconix Ltd) describes granules comprising a manganese bleaching catalyst, a water-soluble polymer, absorbent and filler. In the manufacturing process of these granules the bleaching catalyst is added as a solid during granulation. The granules contain crystals of the bleaching catalyst. This document discloses manganese complexes with TACN or DTNE ligands as bleaching catalysts. An example for this being [$Mn^{IV}Mn^{IV}(\mu\text{-}O)_2(\mu\text{-}CH_3COO)(Me_4\text{-}DTNE)$] ($PF_6$).

WO 2011/006934 A1 supports the fact that said Mn complexes with PF6 as counterion are poorly water soluble. For the skilled artisan it will be clear that large cationic metal complexes (like the Mn complexes with TACN and DTNE) combined with large counterions, e.g. $PF_6^-$ or $ClO_4^-$ give rise to poorly water soluble metal complexes, because large counterions fit neatly in the solid containing the large cation. This results in a very good crystal packing which is a driving force to precipitate from water. Therefore, these complexes possess only poor solubility in water.

WO2018/210442 (Weylchem Wiesbaden GmbH) describes polyvinylalcohol coated granules comprising a manganese bleaching catalyst. The granules known from this document are characterized by a coating content of 5% by weight or less. In the examples granules comprising a MnTACN bleaching catalyst (Peractive® FDO-X) are disclosed. This bleaching catalyst is a salt having $PF_6^-$ as an anion and having low water-solubility of 10.8 g/L at 20° C. Besides this bleaching catalyst other bleaching catalysts are disclosed in this document, some of these having high water-solubility. Low amount of coating and bleaching catalyst containing granules disclosed in this document show improved storage stability when compared to uncoated granules. This document provides no motivation for the skilled artisan to modify the bleaching catalyst in order to improve the storage-stability or the bleaching performance of the granules.

WO 2014/202954 A2 discloses a method of making manganese ion-containing catalyst salts comprising non-coordinating silicate-based counterions. Selected manganese complex salts are adsorbed onto an alkaline earth metal silicate. These products may be used as bleaching catalysts in laundry and dishwasher compositions.

EP3167036B (Novozymes A/S) describe granules containing an enzyme a multiple coating by a manganese catalyst, a water-soluble salt and optionally a third coating by a film-forming agent such as polyvinylalcohol.

EP2966161A (Dalli Werke GmbH) discloses particles containing in the core an enzyme and a manganese bleaching catalyst which is coated by a water soluble coating compound.

WO2017/118543 (Dalli Werke GmbH) describes co-granulates comprising a manganese bleaching catalyst and a binder, which is coated by a water-soluble polymer or acid.

WO2017/153528 (Unilever N.V, Unilever PLC, Conopco, Inc) describes detergent formulations comprising coated granules comprising a manganese catalyst.

WO2016/177439 (Novozymes A/S) describe coated granules wherein the coating comprises the manganese catalyst particles.

Whilst various patents describe granules and related compositions in bleaching formulations, for example of use in dishwashing and laundry applications to ensure accurate dosing of bleach activating catalysts, there remains still a need to improve useful stability of said catalysts in detergent formulations upon storage. The present invention is intended to address this need.

SUMMARY OF THE INVENTION

We have surprisingly found that when a solution comprising a selected bleaching catalyst, which is a water-soluble mononuclear or dinuclear manganese complex, is added to a mixture that comprises a water-soluble polymer, a selected absorbent and optionally a filler, salt and/or a bleach activator results in a formation of composition, preferably granules, showing very high bleaching activity for extended periods of storage time. This finding is even more surprising as the storage experiments described in WO2006/125517 A1 show that the aqueous solutions of water-soluble catalysts are not fully stable and decompose significantly already after two weeks of storage at 37° C.

Viewed from a first aspect, therefore, the invention provides a composition, preferably a granule, containing a water-soluble polymer, a selected absorbent and a water soluble transition metal ion containing bleaching catalyst, wherein the water-soluble transition metal ion containing bleaching catalyst has a water solubility of at least 30 g/L at 20° C. and is a water-soluble mononuclear or dinuclear Mn(III) and/or Mn(IV) complex comprising a ligand of formula (I):

(I)

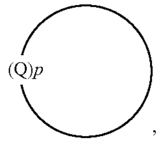

wherein:

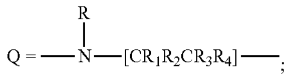

p is 3;

R is independently selected from the group consisting of hydrogen, $C_1$-$C_{24}$ alkyl, $CH_2CH_2OH$ and $CH_2COOH$; or one R is linked to the nitrogen atom of another Q of another ring of formula (I) via a $C_2$-$C_6$ alkylene bridge, a $C_6$-$C_{10}$ arylene bridge or a bridge comprising one or two $C_1$-$C_3$ alkylene units and one $C_6$-$C_{10}$ arylene unit, which bridge may be optionally substituted one or more times with independently selected $C_1$-$C_{24}$ alkyl groups; and $R_1$, $R_2$, $R_3$, and $R_4$ are independently selected from H, $C_1$-$C_4$ alkyl and $C_1$-$C_4$-alkylhydroxyl.

Viewed from a second aspect, the invention provides a method of manufacturing said compositions, preferably as granules, said method comprising a) providing in a mixing device a composition containing a water soluble polymer, a selected absorbent, and a solution comprising between 2 and 75 wt.-%, referring to the total amount of the solution, of a water-soluble transition metal ion containing bleaching catalyst, said water-soluble transition metal ion containing bleaching catalyst having a water solubility of at least 30 g/L at 20° C. and being a mononuclear or dinuclear Mn(III) and/or Mn(IV) complex comprising a ligand of formula (I) defined above, and b) mixing the ingredients of said composition.

Viewed from a third aspect, the invention provides a bleaching formulation comprising a composition according to the first aspect of the invention.

Viewed from a fourth aspect, the invention provides a cleaning method comprising contacting a substrate with water and a bleaching formulation according to the third aspect of the invention.

Further aspects and embodiments of the present invention will be evident from the discussion that follows below.

DETAILED DESCRIPTION

Figure 1:
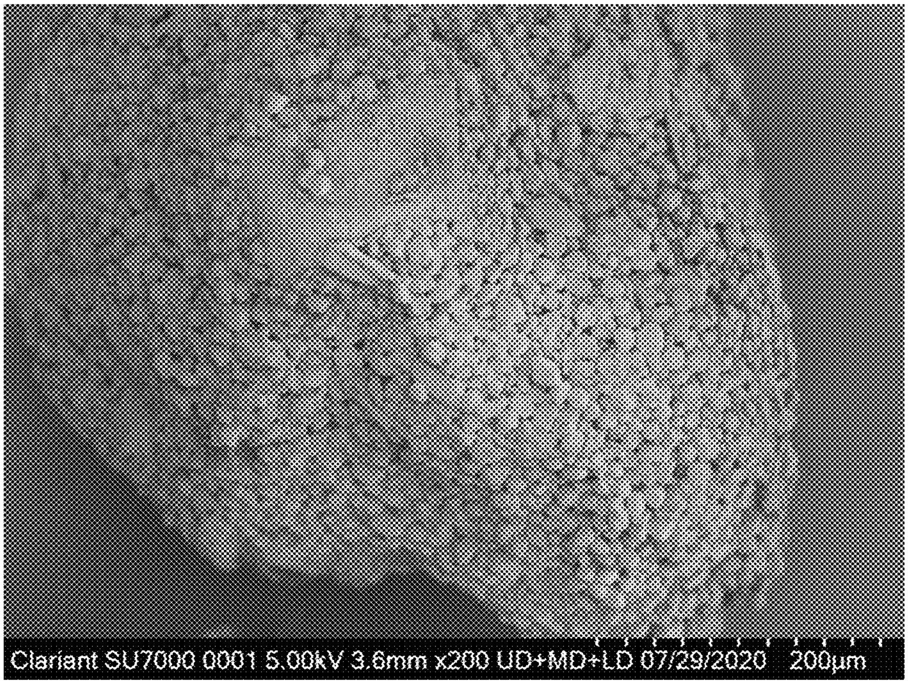
FIG. 1 shows a picture of a granule prepared from a formulation of granule 4 of Table 1.
Figure 2:
FIGS. 2 to 6 show enlarged portions of this granule.
Figure 3:
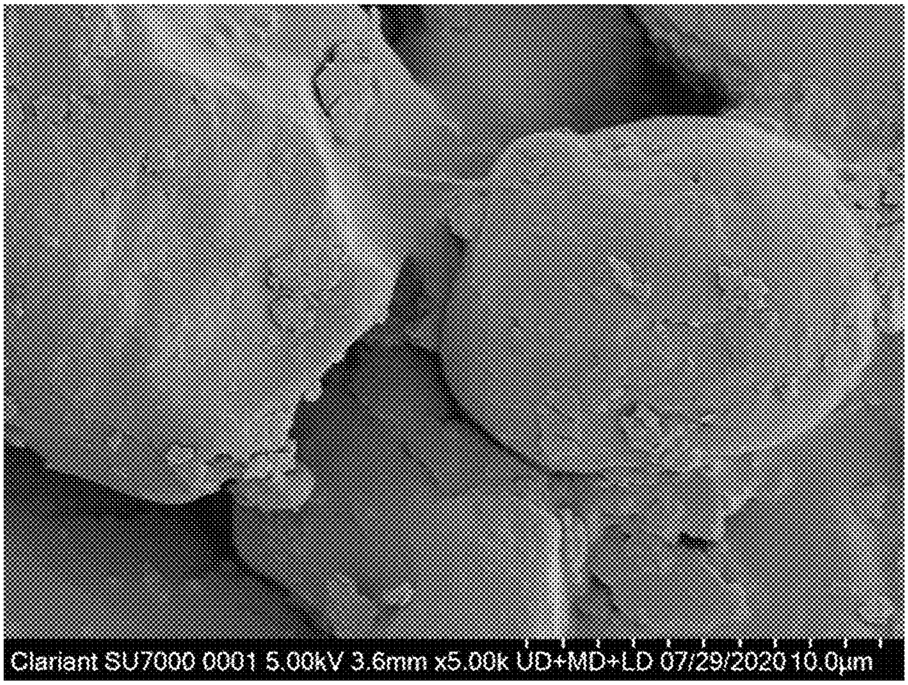
Figure 4:
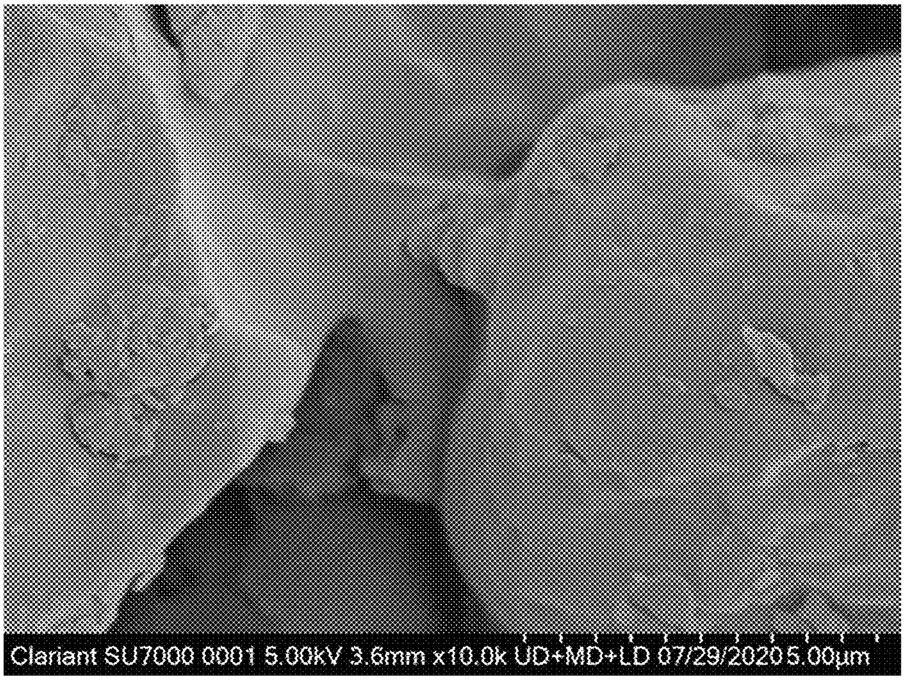
Figure 5:
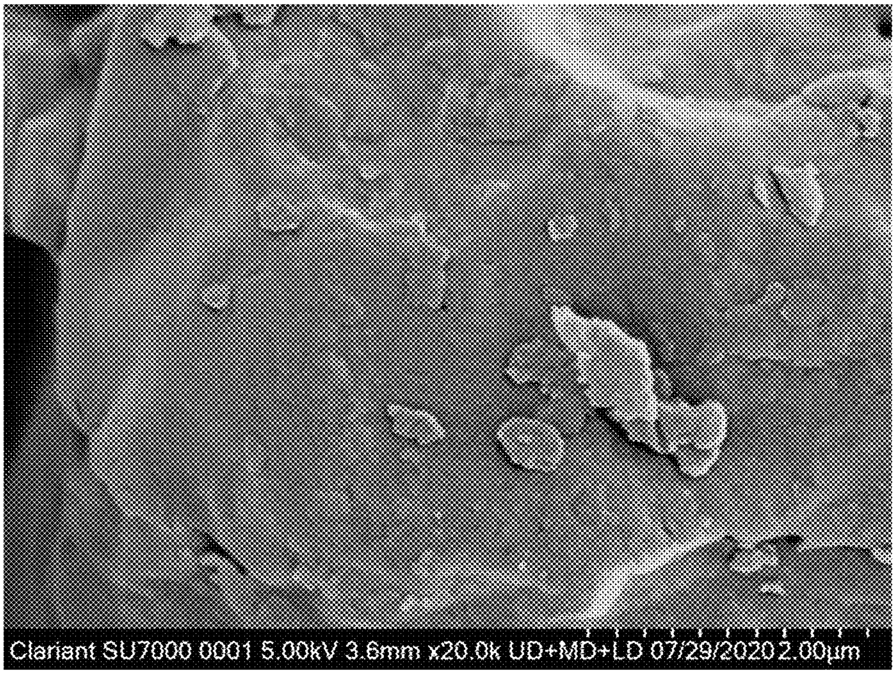
Figure 6:
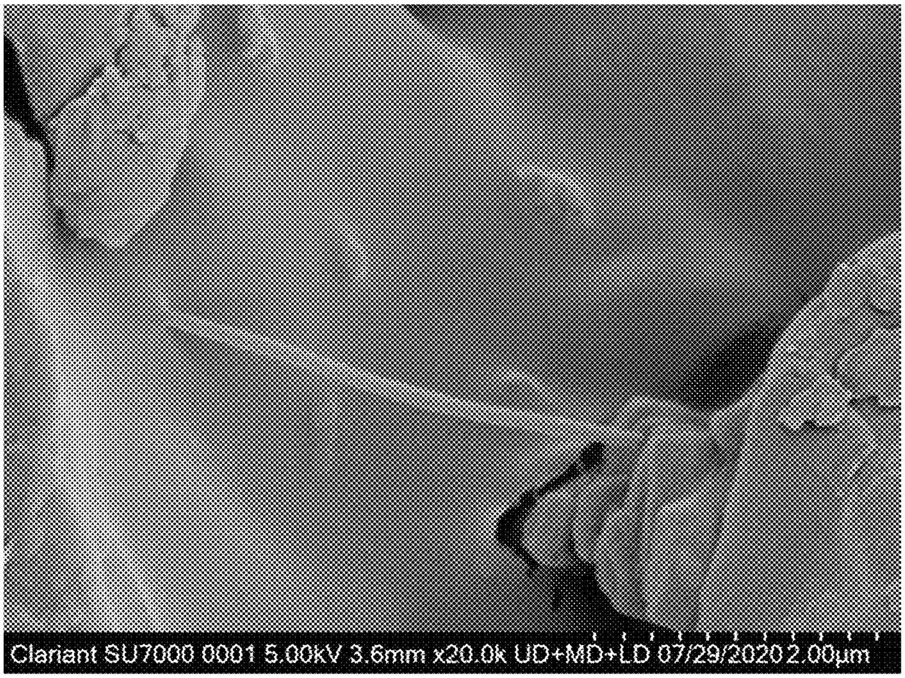

As summarised above, the present invention is based, in part, on the finding that storage-stable compositions comprising selected bleaching catalysts, which are mononuclear or dinuclear manganese complexes comprising ligands of formula (I) described herein, may be prepared from an aqueous solution of said bleaching catalysts, an absorbent and a water-soluble polymer.

Surprisingly, the compositions of the present invention show improved storage stability and increased bleaching activity, compared to conventionally prepared compositions that include a crystalline bleaching catalyst.

Experiments have shown that this is due to the bleaching catalyst which is included in the compositions in a non-crystalline or nanocrystalline form.

The invention therefore also relates to compositions containing water-soluble polymer, selected absorbent, and water-soluble transition metal ion containing bleaching catalyst, wherein the bleaching catalyst is present in the composition in an amorphous or nanocrystalline form.

The term "nanocrystalline" when used in this description is meant to describe a compound with crystals having a mean diameter $D_{50}$ below 1 μm, preferably below 500 nm. The mean diameter is determined via laser diffraction analysis.

The term "amorphous" when used in this description is meant to describe a compound with no crystals determined by using scanning electron microscope analysis.

The term "water-soluble" when used in this description is meant to describe a compound which is soluble in water of 20° C. at a concentration of at least 30 g/L.

Transition metal ion-containing bleaching catalysts, for example as are often included in detergent products, are extraordinarily well known, studied and understood by the skilled person. For example, the following non-limiting list provides examples of patent publications that describe different classes of transition metal ion-containing bleaching catalysts suitable for use according to the various aspects of the present invention: EP 0 485 397, WO 97/48787, WO 00/12667, WO 03/104234, EP 1 557 457, U.S. Pat. No. 6,432,900, US 2005/0209120 and US 2005/0181964.

Typically, the bleaching catalyst is formed from and comprises a polydentate ligand containing 3 to 6 nitrogens atoms, which atoms coordinate to a manganese ion of the catalyst. The bleaching catalyst is typically in the form of a complex of the general formula (A1)

$$[M_aLG_kX_n]Y_m \quad (A1)$$

in which:

M represents a ion selected from Mn(III)-(IV);

LG represents a polydentate ligand as described herein and wherein at least one of the ligands LG is a ligand of formula (I) as described herein;

each X independently represents a coordinating species selected from any mono, bi or tri charged anions and any neutral molecules able to coordinate a transition metal ion in a mono, bi or tridentate manner, preferably selected from $O_2^-$, $R^aBO_2^{2-}$, $R^aCOO^-$, $R^aCONR^-$, $OH^-$, $NO_3^-$, NO, $S^{2-}$, $R^aS^-$, $PO_4^{3-}$, $PO_3OR^{a3-}$, $H_2O$, $CO_3^{2-}$, $HCO_3^-$, $R^aOH$, $N(R^a)_3$, $R^aOO^-$, $O_2^{2-}$, $O_2^-$, $R^aCN$, $Cl^-$, $Br^-$, $OCN^-$, $SCN^-$, $CN^-$, $N_3^-$, $F^-$, $I^-$, $R^aO^-$, $ClO_4^-$, and $CF_3SO_3^-$, and more preferably selected from $O^2$, $R^aBO_2^{2-}$, $R^aCOO^-$, $OH^-$, $NO_3^-$, $S^{2-}$, $R_aS^-$, $PO_3^{4-}$, $H_2O$, $CO_3^{2-}$, $HCO_3^-$, $R^aOH$, $N(R^a)_3$, $Cl^-$, $Br^-$, $OCN^-$, $SCN^-$, $R^aCN$, $N_3^-$, $F^-$, $I^-$, $R^aO^-$, $ClO_4^-$, and $CF_3SO_3^-$;

each $R^a$ independently represents a group selected from hydrogen, hydroxyl, -R" and —OR", wherein R"═$C_1$-$C_{20}$-alkyl, $C_2$-$C_{20}$-alkenyl, $C_1$-$C_{20}$-heterocycloalkyl, $C_6$-$C_{10}$-aryl, $C_6$-$C_{10}$-heteroaryl, (C═O)H, (C═O)—$C_1$-$C_{20}$-alkyl, (C═O)—$C_6$-$C_{10}$-aryl, (C═O)OH, (C═O)O—$C_1$-$C_{20}$-alkyl, (C═O)O—$C_6$-$C_{10}$-aryl, (C═O)$NH_2$, (C═O)NH($C_1$-$C_{20}$-alkyl), (C═O)NH ($C_6$-$C_{10}$-aryl), (C═O)N($C_1$-$C_{20}$-alkyl)$_2$, (C═O)N($C_6$-$C_{10}$-aryl)$_2$, R" being optionally substituted by one or more functional groups E, wherein E independently represents a functional group selected from —F, —Cl, —Br, —I, —OH, —OR', —$NH_2$, —NHR', —N(R')$_2$, —N(R')$_3$+, —C(O)R', —OC(O)R', —COOH, —$COO^-$ ($Na^+$, $K^+$), —COOR', —C(O)$NH_2$, —C(O)NHR', —C(O)N(R')$_2$, heteroaryl, —R', —SR', —SH, —P(R')$_2$, —P(O)(R')$_2$, —P(O)(OH)$_2$, —P(O)(OR')$_2$, —$NO_2$, —$SO_3H$, —$SO_3$—($Na^+$, $K^+$), —S(O)$_2$R', —NHC(O)R', and —N(R')C(O)R', wherein R' represents $C_6$-$C_{10}$-aryl, $C_7$-$C_{20}$-arylalkyl, or $C_1$-$C_{20}$-alkyl each of which may be each of which may be optionally substituted by —F, —Cl, —Br, —I, —$NH_3^+$, —$SO_3H$, —$SO_3^-$($Na^+$, $K^+$), —COOH, —COO—($Na^+$, $K^+$), —P(O)(OH)$_2$, or —P(O)($O^-$($Na^+$, $K^+$))$_2$, and preferably each $R^a$ independently represents hydrogen, $C_1$-$C_{40}$-alkyl or optionally $C_1$-$C_{20}$alkyl-substituted $C_6$-$C_{10}$-aryl, more preferably hydrogen or optionally substituted phenyl or naphthyl, or $C_{1-4}$-alkyl;

Y is a non-coordinating counterion;

a is an integer from 1 or 2 and most preferred 2;

k is an integer from 1 to 4; and preferably 1 or 2;

n is an integer from 0 to 4; and preferably 0 to 2;

m is zero or an integer from 1 to 20, and is typically an integer from 1 to 8, preferably from 1 to 2.

As used herein, within the definitions provided above for formula (A1) and elsewhere, unless the context expressly dictates to the contrary, references to alkyl moieties, by which is meant saturated hydrocarbyl radicals, embrace alkyl groups that may comprising branched and/or cyclic portions. Likewise, references to alkenyl and alkynyl moieties embrace groups that may comprise branched and/or cyclic portions.

The counter ions Y in formula (A1) balance the charge z on the complex formed by the chelating ligand(s) LG, metal ion(s) M and coordinating species X. According to this invention if the charge z is positive, and Y is anion such as $R^bCOO^-$, $BPh_4^-$, $ClO_4^-$, $BF_4^-$, $PF_6^-$, $R^bSO_3^-$, $R^bSO_4^-$, $SO_4^{2-}$, $NO_3^-$, $F^-$, $Cl^-$, $Br^-$, or $I^-$, with $R^b$ being hydrogen, $C_1$-$C_{40}$-alkyl or optionally $C_1$-$C_{20}$alkyl-substituted $C_6$-$C_{10}$aryl. If the charge z is negative, then suitable counterions include alkali metal, alkaline earth metal or (alkyl) ammonium cation. Preferably, the charge z is positive, i.e. generally the manganese ion-containing bleaching catalyst is a catalyst salt comprising one or two manganese ions and one or more non-coordinating counteranions Y.

The identity of the counteranion(s) is not an essential feature of the invention. Suitable counter ions Y include those which give rise to the formation of water-soluble manganese complexes forming storage-stable solids. Often counterions, including those for the preferred metal complexes, are selected from $Cl^-$, $Br^-$, $I^-$, $NO_3^-$, $ClO_4^-$, $PF_6^-$, $R^cSO_3^-$, $SO_4^{2-}$, $R^cSO_4^-$, $CF_3SO_3^-$, and $R^cCOO^-$, with $R^c$ in this context being selected from H, $C_{1-12}$ alkyl, and optionally $C_{1-6}$ alkyl-substituted $C_6H_5$ (i.e. wherein $C_6H_5$ is substituted one or more times (e.g. once) with a $C_{1-6}$alkyl group; often $C_6H_5$ is unsubstituted). Often, these will be selected from $Cl^-$, $NO_3^-$, $PF_6^-$, tosylate, $SO_4^{2-}$, $CF_3SO_3^-$, acetate, and benzoate. Particularly often, these will be selected from the group consisting of $Cl^-$, $NO_3^-$, $SO_4^{2-}$ and acetate.

The manganese ion-containing bleaching catalyst according to formula (A1) typically comprises, as chelating ligand (s) LG, one or more tridentate, tetradentate, pentadentate, or hexadentate nitrogen donor ligands. It will be understood that the terms tridentate, tetradentate, pentadentate and hexadentate refer to the number of manganese ion-binding donor atoms (in this case being nitrogen donor atoms) that can bind to a manganese ion. For example, a tridentate nitrogen donor refers to an organic molecule that contains three nitrogen atoms with lone pairs, which can bind to a manganese ion. These nitrogen donor atoms can be either an aliphatic nitrogen donor, either a tertiary, secondary or primary amine, or a nitrogen donor belonging an aromatic ring, for example pyridine. Whilst the name suggests that all nitrogen donors present in a ligand bind to a manganese ion-containing complex, this need not necessarily be so. For example, when a ligand is a hexadentate nitrogen donor, it suggests that the ligand can bind with 6 nitrogen donor atoms, but it may only bind with 5 nitrogen donor atoms, leaving one coordination site open to bind to another molecule, such as the hydrogen peroxy anion. This discussion presumes that a manganese ion can bind to 6 donor atoms, which is generally, but not always, the case.

The manganese ion containing bleaching catalyst used according to the invention comprises a chelating ligand of formula (I):

(I)

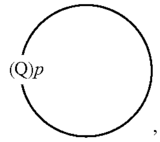

, wherein Q, p, R, $R_1$, $R_2$, $R_3$, and $R_4$ are as hereinbefore described.

Ligands of formula (I) form complexes with, for example, one or two manganese ions, which complexes may be, or constitute part of, the bleaching catalyst.

Transition metal catalyst salts having significant water-solubility, such as at least 30 g/l at 20° C., e.g. at least 50 g/l at 20° C. or at least 70 g/l at 20° C., are described in WO 2006/125517 A1. On account of their high water solubility, the use of such salts, for example those comprising small counterions such as chloride, nitrate, sulfate and acetate, can be advantageous. Also, catalyst salts comprising the tosylate anion, such as those described in WO 2011/066934 A1 and WO 2011/066935 A1 (both Clariant International Ltd) are also contemplated according to specific embodiments of the aspects of the present invention.

The preferred mononuclear or dinuclear Mn(III) and/or Mn(IV) complex comprises one or two ligands of formula (I) as herein defined. The skilled person is very familiar with such complexes, which may be made in situ, without isolation, or be well-defined.

By a well-defined complex is meant herein (as the term is used customarily in the art) a complex that has been isolated such that it is susceptible to characterisation (i.e. definition) and analysis (e.g. to determine its structure and degree of purity). In contrast, a complex that is not well-defined is one that is prepared without isolation from the medium (e.g. reaction medium) in which it is prepared.

Typically, the Mn(III) and/or Mn(IV) complex is a dinuclear complex and the subsequent discussion focuses on these. However, the use of mononuclear manganese complexes is also within the scope of the present invention. These manganese complexes are mostly applied as salts. Examples of such complexes are described in EP 0 549 271 A1, EP 0 549 272 A1, EP 0 544 519 A2 and EP 0 544 440 A2.

The absorbent is another essential feature of the present invention in order to absorb the water that is employed as the carrier for the manganese catalyst. The water-soluble polymer aids to keep the integrity of the granules during the drying process. The water-soluble polymer is not necessarily used as a coating material, but can be added in conjunction with the absorbent and manganese catalyst solution.

According to particular embodiments, each R in the ligand of formula (I) is independently selected from the group consisting of hydrogen, $C_1$-$C_{24}$ alkyl, $CH_2CH_2OH$ and $CH_2COO$ H; or one R is linked to the nitrogen atom of another Q of another ring of formula (I) via an ethylene or a propylene bridge.

According to other preferred embodiments, each R in the ligand of formula (I) is independently selected from the group consisting of hydrogen, $C_1$-$C_6$ alkyl, $CH_2CH_2OH$ and $CH_2COOH$; or one R is linked to the nitrogen atom of another Q of another ring of formula (I) via an ethylene or a propylene bridge.

According to other preferred embodiments, R in the ligand of formula (I) is independently selected from the group consisting of $C_1$-$C_{24}$ alkyl, $CH_2CH_2OH$ and $CH_2COOH$; or one R is linked to the nitrogen atom of another Q of another ring of formula (I) via an ethylene or a propylene bridge.

According to other preferred embodiments, each R in the ligand of formula (I) is independently selected from: $CH_3$, $C_2H_5$, $CH_2CH_2OH$ and $CH_2COOH$.

According to other preferred embodiments, each R in the ligand of formula (I) is independently selected from the group consisting of $C_1$-$C_6$ alkyl, in particular methyl; or one R is linked to the nitrogen atom of another Q of another ring of formula (I) via an ethylene or a propylene bridge. Where one R is linked to the nitrogen atom of another Q of another ring of formula (I), this is typically via an ethylene bridge. In such embodiments, the other R groups, including those in the other ring of formula (I), are the same, typically $C_1$-$C_6$alkyl, in particular methyl.

According to further particular embodiments, including each of those particular embodiments described in the immediately preceding paragraph, $R_1$, $R_2$, $R_3$, and $R_4$ in the ligand of formula (I) are independently selected from hydrogen and methyl, in particular embodiments in which each of $R_1$, $R_2$, $R_3$, and $R_4$ is hydrogen.

When a ligand of formula (I) comprises one group R linked to the nitrogen atom (i.e. N) of another Q of another ring of formula (I) via a bridge, it will be understood that such ligands of formula (I) in particular embodiments comprising an ethylene bridge may alternatively be represented by the following structure:

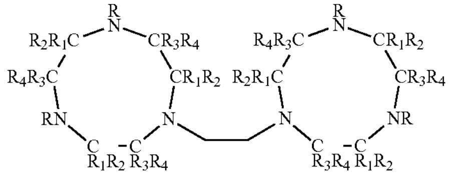

wherein R, $R_1$, $R_2$, $R_3$, and $R_4$ are as herein defined, including the various specific embodiments set out.

Where a bridge is present in the ligands of formula (I) this may be a $C_2$-$C_6$ alkylene bridge. Such alkylene bridges are typically although not necessarily straight chain alkylene bridges as discussed below. They may, however, be cyclic alkylene groups (e.g. the bridge may be cyclohexylene). Where the bridge is a $C_6$-$C_{10}$ arylene bridge, this may be, for example, phenylene or the corresponding arylene formed by abstraction of two hydrogen atoms from naphthalene. Where the bridge comprises one or two $C_1$-$C_3$ alkylene units and one $C_6$-$C_{10}$ arylene unit, such bridges may be, for example, —$CH_2C_6H_4CH_2$— or —$CH_2C_6H_4$—. It will be understood that each of these bridges may be optionally substituted one or more times, for example once, with independently selected $C_1$-$C_{24}$ alkyl (e.g. $C_1$-$C_{18}$ alkyl) groups.

In the ligands of formula (I), the bridge is typically a $C_2$-$C_6$ alkylene bridge. Where this is so, the bridge is typically a straight chain alkylene, e.g. is ethylene, n-propylene, n-butylene, n-pentylene or n-hexylene. According to particular embodiments, the $C_2$-$C_6$ alkylene bridge is ethylene or n-propylene. According to still more particular embodiments, the $C_2$-$C_6$ alkylene bridge is ethylene. Herein, references to propylene are intended to refer to n-propylene (i.e. —$CH_2CH_2CH_2$—, rather than —$CH(CH_3)CH_2$—) unless the context expressly indicates to the contrary.

According to particular embodiments of the invention, the ligand of formula (I) is 1,4,7-trimethyl-1,4,7-triazacyclononane ($Me_3$-TACN) or 1,2-bis(4,7-dimethyl-1,4,7-triazacyclonan-1-yl)-ethane ($Me_4$-DTNE). According to still more particular embodiments of the invention, the ligand of formula (I) is $Me_3$-TACN.

The salt of the complex may comprise both coordinating ligands (i.e. which coordinate to one or two manganese ions in the complex of the salt) and non-coordinating ligands (i.e. which do not coordinate to a manganese ion).

Preferred mononuclear Mn(III) and/or Mn(IV) complexes comprise one coordinating ligand of formula (I). Preferred dinuclear Mn(III) and/or Mn(IV) complexes comprise either two coordinating ligands of formula (I), or one coordinating ligand of formula (I) where this comprises one group R linked to the nitrogen atom of another Q of another ring of formula (I) via a bridge, as described herein, e.g. is $Me_4$-DTNE.

Additionally, both mononuclear and dinuclear Mn(III) and/or Mn(IV) complexes may comprise additional coordinating ligands. For dinuclear complexes, these are typically oxide ($O^{2-}$) or $C_{1-6}$ carboxylate (i.e. $RCO_2^-$ wherein R is an alkyl group) ions, which bridge the two manganese ions. Where present, an alkylcarboxylate ion is typically acetate. Typically, dinuclear Mn(III) and/or Mn(IV) complexes comprise two or three bridging oxide ions. For example, dinuclear manganese ion-containing complexes may comprise two oxide ions and one acetate ion, each of which bridges the two manganese ions; or three oxide ions, each of which bridges the two manganese ions.

According to particular embodiments of all aspects of the invention, there is contemplated the use of dinuclear manganese ion-containing complexes comprising two ligands of formula (I) which do not comprise one group R linked to the nitrogen atom of another Q of another ring of formula (I) via a bridge, for example $Me_3$-TACN, in which the manganese ions are bridged by three oxide ions. According to particular embodiments, such complexes comprise two Mn(IV) ions. For example, the complex may be $[Mn^{IV}Mn^{IV}(\mu\text{-}O)_3(Me_3\text{-}TACN)_2]^{2+}$, "μ" denoting, according to convention, a bridging ligand.

According to other particular embodiments of all aspects of the invention, there is contemplated the use of dinuclear manganese ion-containing complexes comprising one ligand of formula (I) which does comprise one group R linked to the nitrogen atom of another Q of another ring of formula (I) via a bridge, for example $Me_4$-DTNE, in which the manganese ions are bridged by two oxide ions and one acetate ion.

According to particular embodiments, such complexes comprise one Mn(IV) ion and one Mn(III) ion. For example, the complex of the salt may be $[Mn^{III}Mn^{IV}(\mu\text{-}O)_2(\mu\text{-}CH_3COO)(Me_4\text{-}DTNE)]^{2+}$.

The mononuclear or dinuclear manganese ion-containing complex of the salt has an overall positive charge, which is balanced by one or more non-coordinating counteranions. The counteranion(s) will typically be selected from $Cl^-$, $Br^-$, $I^-$, $NO_3^-$, $ClO_4^-$, $PF_6^-$, $RSO_3^-$, $SO_4^{2-}$, $RSO_4^-$, $CF_3SO_3^-$, and $RCOO^-$, with R in this context being selected from H, $C_{1-12}$ alkyl, and optionally $C_{1-6}$ alkyl-substituted $C_6H_5$ (i.e. wherein $C_6H_5$ is substituted one or more times (e.g. once) with a $C_{1-6}$ alkyl group; often $C_6H_5$ is unsubstituted). Often, these will be selected from $Cl^-$, $NO_3^-$, $PF_6^-$, tosylate, $SO_4^{2-}CF_3SO_3^-$, acetate, and benzoate. Particularly often, these will be selected from the group consisting of $Cl^-$, $NO_3^-$, $SO_4^{2-}$ and acetate.

Particularly preferred water-soluble bleaching catalysts are $[Mn_2(\mu\text{-}O)_3(Me_3TACN)_2]SO_4$ (abbreviated as $MnTACNSO_4$) and $[Mn_2(\mu\text{-}O)_3(Me_3TACN)_2](NO_3)_2$.

Transition metal catalyst salts having significant water-solubility, such as at least 30 g/l at 20° C., or at least 50 g/l at 20° C. or at least 70 g/l at 20° C., are described in WO 2006/125517 A1. The use of such highly water-soluble salts, for example those comprising small counterions such as chloride, nitrate, sulfate and acetate, can be advantageous since their high solubilities in water mean, for example, that more concentrated solutions of the salts can be used when contacting them with the absorbent and water-soluble polymer solution than when using poorly water-soluble salts, such as those comprising the $PF_6^-$ ion. For example, $[Mn^{IV}Mn^{IV}(\mu\text{-}O)_3(Me_3\text{-}TACN)_2]^{2+}(PF_6^-)_2$ has a water solubility of only 10.8 g/l at 20° C. Moreover, salts of anions such as $PF_6^-$ are typically formed by introduction of the $PF_6^-$ ion as a potassium salt after the formation of the transition metal ion-containing complex, which leads to precipitation of the resultant salt. This precipitate is then typically redissolved, for example in water, prior to contacting with the absorbent and water-soluble polymer. Such additional steps introduce complexity and cost, as well as often occasioning the use of relatively large volumes of water, since the solubility (in water) of transition metal ion-containing catalyst salts, such as manganese catalyst salts described herein that comprise $PF_6^-$ non-coordinating counterions is quite low.

In an embodiment, the composition comprises between 0.1 and 25 wt-% of the mononuclear or dinuclear Mn(III) and/or Mn(IV) complex. Suitably, the composition comprises between 0.2 and 20 wt-% of the mononuclear or dinuclear Mn(III) and/or Mn(IV) complex. More suitably, the composition comprises between 0.3 and 10 wt-% of the mononuclear or dinuclear Mn(III) and/or Mn(IV) complex. Even more suitably, the composition comprises between 0.5 and 7.0 wt-% of the mononuclear or dinuclear Mn(III) and/or Mn(IV) complex.

In an embodiment, the mononuclear or dinuclear Mn(III) and/or Mn(IV) complex is dosed as a solution with a concentration of at least 2 wt-% of dried complex. Suitably, the solution is an aqueous solution comprising between 2 wt-% and 75 wt-% of said complex. More suitably, an aqueous solution of between 2 wt-% and 50 wt-% of said complex. More suitably, an aqueous solution of between 3 wt-% and 30 wt-% of said complex. More suitably, an aqueous solution of 5 wt-% and 25 wt-% of said complex. Most suitably, an aqueous solution of 10 wt-% and 20 wt-% of said complex. Optionally, said aqueous solutions comprising the complex, may contain organic or inorganic buffers, such as acetate, citrate and benzoate buffers as disclosed in WO2006/125517 (Hindustan Lever Ltd.). Optimally the pH of the aqueous solution comprising the complex is between 2 to 7 and more typically between pH 4 and 6. The aqueous solutions comprising said complex do contain no solids or up to 1 wt.-% of solids, preferably no solids or less than 0.1 wt.-% of solids.

In certain embodiments, alternative a suitable solution can be used that is not aqueous. Besides water, suitable solutions include polar liquids, such as alcohols (in particular $C_{1-6}$ alcohols, for example methanol, ethanol and n- and isopropanol), or mixtures thereof. As described in WO 2011/106906 A1, the complexes may be synthesised in water/alcohol (e.g. water/ethanol) mixtures, or even in mainly non-aqueous solvents.

The method of the second aspect of the invention comprises contact of a solution comprising a mononuclear or dinuclear Mn(III) and/or Mn(IV) complex as a bleaching catalyst, a water-soluble polymer and an absorbent.

The water-soluble polymer that is used to make the compositions encompassing the mononuclear or dinuclear manganese complex according to the first aspect of the invention, includes poly(vinylpyrrolidone), polyalkylene glycol, functionalised poly-(vinylalcohol)s polymers, and polyacrylates. Other suitable water-soluble polymers are listed in e.g. WO2018/011596 (Itaconix Ltd.). Typically poly(vinylalcohol)s (PVOH) polymers are employed, whereby the molecular weight of said polymers are typically between 10,000 and 200,000, and more typically between 20,000 and 100,000, as determined by Gel Permeation Chromatography (GPC) at 20° C., having a viscosity of at 4 wt-% of ca. 2 to 70 mPa·s, measured according to DIN 53015. Polyvinylalcohol polymers are typically prepared via hydrolysis of polyvinylacetate having an 70 to 100 mol-% extent of hydrolysis. Suitable degrees of hydrolysis are between 80 and 99 mol-%, which leads to favourable solubility characteristics. A variety of PVOH polymers having different degrees of polymerisation and hydrolysis are available under the trade name Poval® of Kuraray Chemicals.

Also modified polyvinylalcohol polymers could be used, such as hydrophobic or hydrophilic modified ones. For example, hydrophobic polyvinylalcohol polymers include ethylene-modified ones, such as Exceval® of the firm Kuraray. Also the vinylalcohol groups may be partly modified by reaction with aldehydes, especially C2-C10 aldehydes as exemplified in WO2018/011596 (Itaconix Ltd.).

In an embodiment, the composition comprises between 0.1 and 20 wt-% of the water-soluble polymer. Suitably, the composition comprises between 0.3 and 15 wt-% of the water-soluble polymer. More suitably, the composition comprises between 0.5 and 10 wt-% of the water-soluble polymer. Even more suitably, the composition comprises between 1.0 and 8.0 wt-% of the water-soluble polymer.

In an embodiment the water-soluble polymer is added as an aqueous solution to the composition comprising the absorbent and the solution of the salt of the complex. The concentration of the water-soluble polymer is between 5 and 50 wt-% in water, more typically between 10 and 30 wt-%. Most typically higher concentrations of the polymer dissolved in water will be preferred.

The absorbent that is included in the compositions is essential to obtain absorbance and/or removal of water upon addition of the aqueous solution comprising the water-soluble polymer and the solution of the complex. It also aids in binding together the components of the composition, especially during the drying processes. Suitable absorbents are based on polysaccharides, which are polymers of monosaccharides with typical polymer chain lengths of 40-3000 monosaccharides units. Examples of suitable polysaccharides include starch, natural gums, such as alginate, or cellulose, glycogen, chitin, callose, lumarinin, chrysolaminarim, xylan, arabinoxylan, mannan, fucoidan, galactomannan. Also modified polysaccharides, such as modified starch or modified cellulose, may be used. Most suitable as absorbent is a starch, which is a polymer of glucose in which the glucopyranose units are bonded by alpha-linkages. Suitable sources of starch are potato starch, maize starch, rice starch, wheat starch and partially pregellatinised starches from the aforementioned list. Alternatively, the absorbent may be a modified starch, such as dextrin, a natural gum, such as alginate. Most suitably, the absorbent is maize starch, potato starch or rice starch. Also particularly suitable are cellulosic materials, such as cellulose fibers, methyl cellulose, hydroxyethyl cellulose, hydroxypropyl cellulose, or carboxy-modified celluloses, such as carboxylmethyl cellulose (CMC). Most suitable is cellulose, in particular microcrystalline cellulose (e.g. Heweten® 101).

Natural gums are polysaccharides of natural origin which are capable of causing a large increase in solution viscosity. They are mostly botanical gums, found in the woody elements of plants or in seed coatings. Examples of natural gums are natural gums obtained from seaweeds, e.g. agar, alginic acid, sodium alginate and Carrageenan, or natural gums obtained from non-marine botanical resources, e.g. gum arabic, gum ghatti, gum tragacanth, Karaya gum, guar gum, Locust bean gum, beta-glucan, dammar gum, glucomannan, Psyllium seed husks and Tara gum, or natural gums produced by bacterial fermentation, e.g. gellan gum or xanthan gum.

In an embodiment, the composition comprises 5-75 wt-% of the absorbent. In another embodiment the composition comprises between 10 and 60 wt-% of the absorbent. In yet another embodiment the composition comprises between 15 and 50 wt-% of the absorbent. In an embodiment, the absorbent is added as a solid material having a purity typical of more than 90 wt-% and more typical of more than 95 wt-%

The filler that may be included in the composition can be either an organic filler or an inorganic filler, or a mixture thereof. Suitable organic fillers are different from the polysaccharides used as adsorbent and include saccharides and derivatives thereof, including sugars. Examples of sugars include glucose, dextrose, fructose, galactose, sucrose, lactose, maltose. Also modified saccharides may be used.

In another embodiment the filler is an inorganic filler. Inorganic fillers include talcs, micas, zeolites, silicates, silicas and clays. Suitably, the inorganic filler is selected from talcs, micas, zeolites, and silicates.

In an embodiment the composition comprises between 0 and 85 wt-% of a filler. In another embodiment the composition comprises between 0 and 60 wt-% of a filler. In another embodiment the composition comprises between 0 and 40 wt-% of a filler. In yet another embodiment the composition comprises between 0 and 20 wt-% of a filler. In another embodiment the composition does not contain any filler.

The salt that may be included in the composition are typically alkali metal, alkali earth metal, or transition-metal salts of bicarbonates, carbonates, halides (chloride, bromide or iodide), sulfates, phosphates, oxides, acetates, citrates or nitrates.

In an embodiment the salts comprises one or more salts selected from the group consisting of sodium bicarbonate, sodium sulfate, sodium chloride, sodium nitrate, sodium acetate, sodium citrate, sodium nitrate, potassium sulfate, potassium chloride, potassium citrate, calcium carbonate, calcium chloride and calcium sulfate. Suitably, the inorganic salt comprises one or more salts selected from the group consisting of sodium sulfate, calcium carbonate and sodium citrate.

In a preferred embodiment the salts are water-soluble.

In an embodiment the composition comprises between 0 and 85 wt-% of a salt. In another embodiment the composition comprises between 0 and 60 wt-% of a salt. In another embodiment the composition comprises between 0 and 40 wt-% of a salt. In yet another embodiment the composition comprises between 0 and 20 wt-% of a salt. In another embodiment the composition does not contain any salt.

The composition may also comprise of a bleaching activator. As bleaching activators, the compositions of the invention can contain compounds generally known from the prior art. These are preferably multiple acylated alkylene diamines, in particular tetraacetylethylene diamine (TAED), acylated triazine derivatives, in particular 1.5-diacetyl-2, 4-dioxohexahydro-1,3,5-triazine (DADHT), acylated glycolurils, in particular tetraacetylglycoluril (TAGU), glyceroltriacetate (triacetin), N-acylimides, in particular N-nonanoyl succinimide (NOSI), acylated phenolic sulfonates, in particular n-nonanoyloxi- or n-lauroyloxibenzenesulfonate (NOBS or LOBS), acylated phenolic carboxylic acids, in particular nonanoyloxi- or decanoyloxibenzoic acid (NOBA or DOBA, respectively), carboxylic acid anhydrides, in particular phthalic acid anhydride, acylated multivalent alcohols, preferably triacetine, ethyleneglycol diacetate and 2.5-diacetoxy-2,5-dihydrofurane as well as acetyliertated sorbitol and mannitol or their mixtures, respectively (SORMAN), acylated sugar derivatives, preferably pentaacetylglucose (PAG), pentaacetylfructose, tetraacetylxylose and octaacetyllactose as well as acetylated and optionally N-alkylated glucamine and gluconolactone, and/or N-acylated lactams, for example N-benzoylcaprolactam. Hydrophilic substituted acylacetales and acyllactames can also preferably be used. In addition, nitrile derivatives such as n-methyl-morpholinium acetonitrile-methyl sulfate (MMA) or cyanomorpholine (MOR) can be used as bleaching activators. Combinations of bleaching activators can also be used.

Suitably the composition may comprise TAED, NOBS, triacetin, and DOBA. More suitably the granule may comprise TAED.

In an embodiment, the composition comprises of 0-80 wt-% of the bleaching activator. Suitably the composition comprises of 0-75 wt-% of the bleaching activator.

Also suitable is a composition without any bleaching activator. Also suitable is a composition that comprises of 20-70 wt-% of the bleaching activator and more suitably between 30-60 wt-% of the bleaching activator.

According to particular embodiments of the invention, therefore, the transition metal ion-containing salt may be provided as an aqueous solution, for example a buffered aqueous solution of the type described immediately hereinbefore. To such solutions, which may be diluted with additional water (or other solvent) if desired, may be added an appropriate quantity of absorbent and water-soluble polymer solution and the resultant mixture mixed, for example by stirring, sonication, vortexing, shaking and the like for a suitable period of time.

Mixing devices for preparing the compositions of the invention are well known to the skilled artisan. All industrial mixing equipment which is capable to mix liquid-solid blends may be used. Mixing may be performed continuously or batchwise.

Examples of mixing devices are anchor mixers, high shear dispersers, static mixers, liquid whistles, paddle mixers, V blenders, ribbon blenders, double cone blenders, high shear mixers/granulators, drum-blenders, twin-screw blenders, cone screw blenders, jet mixers, turbomixers and planetary mixers.

Appropriate conditions such as durations of and temperatures for the contacting will depend on the nature of the reactants (the salt of the complex, absorbent and water-soluble polymer) and their quantities and can be established without undue burden by the skilled person. For example, durations of contacting may be between about 1 min and about 24 hours. Often, the contacting can be carried out at ambient temperature, for example at about 20 to 25° C. although elevated temperatures, for example between about 25 and about 50° C. may be used if desired.

Where contacting according to the second aspect of the invention is partly effected in a liquid (i.e. said solution of salt of the complex and water-soluble polymer), after addition of the absorbent defined herein, a solid material is formed in the resultant mixtures. Thereafter, the material may be further dried, optionally under reduced pressure, generally at a temperature of between about 30° C. and 80° C., for example between about 40° C. and 60° C., for between about 1 and 24 hours. Appropriate conditions can be established without undue burden by the skilled person.

Preferred is a method of manufacturing a bleaching catalyst composition, said method comprises the steps of:

a) providing in a mixing device a composition containing a water soluble polymer, an absorbent, and a solution comprising between 2 and 75 wt.-%, referring to the total amount of the solution, of a water-soluble transition metal ion containing bleaching catalyst, said water-soluble transition metal ion containing bleaching catalyst having a water solubility of at least 30 g/L at 20° C. and being a mononuclear or dinuclear manganese complex as hereinbefore defined;
b) mixing the ingredients of said composition
c) forming particles; and
d) optionally drying the particles resulting from step c).

In a variant of the method of manufacturing a bleaching catalyst composition comprising steps a) to d) the dried particles or granules are further subjected in a step e) to a coating process.

Drying step d) ist preferably conducted in a fluid bed drier.

The granules particles of step c) are preferably formed by wet granulation.

In another preferred embodiment the mixture resulting from step b) is extruded as an extrudate.

In still another preferred embodiment the mixture resulting from step b) is compacted under pressure.

The catalyst compositions of the present invention may be formed by any suitable techniques known in the art. In an embodiment, the quantity of water used in step a) of the process is such that the particles resulting from step c) are granular. In another embodiment, step d) of the process comprises drying the particles resulting from step c) in a fluid bed dryer. In yet another embodiment, step d) of the process comprises drying the particles resulting from step c) at a temperature of between 25-80° C. Suitably, step d) of the process comprises drying the particles resulting from step c) at a temperature of between 35-60° C. Most suitably, step d) of the process comprises drying the particles resulting from step c) at a temperature of between 45-55° C. In a further embodiment, the water-soluble polymer mixed in step b) of the process is provided as an aqueous solution. Suitably, the water-soluble polymer mixed in step b) of the process is provided as a 2 wt % to 30 wt % aqueous solution. More suitably, the water-soluble polymer mixed in step b) of the process is provided as a 2 wt % to 20 wt % aqueous solution. Most suitably, the water-soluble polymer mixed in step b) of the process is provided as a 2 wt % to 10 wt % aqueous solution. Also, the water-soluble polymer mixed in step b) of the process may be provided as a 15 wt % to 25 wt % aqueous solution. The bleaching catalyst, water-soluble polymer, absorbent, filler, and water-soluble salt may be mixed together in the required proportions and then formed into particles by, for example, compression, granulation (wet or dry granulation), spheronisation and extrusion techniques. Alternatively, the water-soluble polymer may be applied to pre-formed particles of the bleaching catalyst in the form of a coating by using any suitable coating technique known in the art. Particular examples of suitable granulation techniques are described in the accompanying example section herein. Thus, in a particular embodiment, the catalyst composition is produced by a granulation technique. In such embodiments, step a) comprises adding water to the bleaching catalyst, water-soluble polymer, absorbent and other optional ingredients, such as filler, water-soluble salt and water under mixing, wherein the quantity of water added is sufficient to form discrete granules of the mixture. Step c) comprises forming discrete particles or granules from the mixture formed from the ingredients provided in step a); and step d) comprises drying the discrete particles or granules resulting from step c) (e.g. in a fluid bed dryer). In another particular embodiment, the catalyst composition is produced by an extrusion technique. In such embodiments, step b) comprises mixing the bleaching catalyst, water-soluble polymer, absorbent and other optional ingredients, such as filler, water-soluble salt and water, to form a mixed mass, which is then extruded as an extrudate as step b'); in an additional step c) the extrudate of step b') is treated so as to form discrete particles or granules (e.g. spheronisation); and step d) comprises drying the discrete particles or granules resulting from step c). In an embodiment, step c) of the process may be skipped and the extrudate resulting from step b') may be directly dried. In another particular embodiment, the catalyst composition is produced by a compaction technique. In such embodiments, step b) comprises mixing the bleaching catalyst, water-soluble polymer, absorbent and other optional ingredients, such as filler, water-soluble salt and water, to form a mixed mass, which is then compacted under pressure in a step c"); and another step c) comprises treating the compacted mixture of step c") so as to form discrete particles or granules (e.g. spheronisation); and step d) comprises drying the discrete particles or granules resulting from step c).

The invention also relates to bleaching formulations comprising the composition of the invention and at least one bleaching agent and/or a precursor thereof.

The compositions according to the invention can be present, for example, as granules, powders or tablet-shaped solids. Preferred are granules.

The production of the granules according to the invention can be carried out according to methods known per se and has already been described in detail in the above-mentioned patent documents. There are basically different granulation methods available.

In a first preferred process variant, building-up of the granules takes place in a mixing apparatus. The components are processed in usual mixing devices operating batch-by-batch or continuously, which are usually equipped with rotating mixing organs. When mixing, all mixing variants are conceivable, which ensure a sufficient mixing of the components.

In a preferred embodiment, all components are mixed at the same time. However, multi-stage mixing processes are also conceivable, in which the individual components are entered in the overall mixture individually or together with other additives in different combinations.

The order of slow and fast mixers can be exchanged according to requirements. The dwell times in the mixer granulation are preferably 0.5 s to 20 min, especially preferred 2 s to 10 min. The granulation fluid can be pumped into the mixing apparatus via simple conduction tubes. For better distribution, however, nozzle systems (single- or multi-material nozzles) are also conceivable.

Typically, a drying step follows the granulation stage to avoid conglutination of the granules. Then, by sieving the coarse grain parts and the fine grain parts are separated. The coarse grain content is crushed by grinding and, like the fine grain content, is fed to a new granulation process. The application of a coating is preferably provided in a fluidized bed apparatus, for example in a fluidized bed mixer.

Solutions are intensively mixed with powdery active substances and other additives optionally present, resulting in a plastically deformable mass. The mixing step can be performed in the above-mentioned mixing apparatus, but also kneaders or special extruder types are conceivable. The granulation mass is then pressed by means of tools through the nozzle holes of a press matrix, creating cylindrically shaped extrudates. The exiting extrudates must be crushed to the desired length or particle size by a post-processing step. In many cases, a length/diameter ratio of L/D=1 is desired. For cylindrical granules, the particle diameter is typically between 0.2 and 2 mm, preferably between 0.5 and 0.8 mm, the particle length is in the range of 0.5 to 3.5 mm, ideally between 0.9 and 2.5 mm. The length or size adjustment of the granules can be obtained, for example, by fixed stripper knives, rotating cut knives, cut wires or blades. To round off the cutting edges, the granules can then be rounded again in a rondier.

After the size adjustment of the granules, often a final solidification step is required in which the solvent is removed and a coating is then applied. This step is usually carried out in a fluidized bed apparatus, which is operated as a dryer. Then, by sieving the coarse grain part and the fine grain part is separated. The coarse grain content is crushed by grinding and, like the fine grain content, is fed to a new granulation process. After that, the generated granules may be equipped with a coating in a fluidized bed apparatus, for example in a fluidized bed mixer.

Preferred granules according to the invention are also characterized by a water content of less than 3% by weight (measured by Karl Fischer), based on the total amount of granules, especially preferred 0 to 2% by weight.

As will be appreciated by the person skilled in the art, it may be desirable to subject compositions according to the first aspect of the invention to further processing, for example to make granules having beneficial properties, to include in the bleaching formulations of the invention, for example solid detergent formulations. Whilst compositions according to the first aspect of the invention can be included in the bleaching formulations as such owing to their excellent storage stability, the formulator may want to modify these particles further, for example, by mixing with a soluble coating agent.

Accordingly, compositions according to the first aspect of the invention, of a desired particle size, may according to some embodiments be coated with a water-soluble material, which coating may optionally be provided with a water-dispersible surface powder coating. The skilled person is aware of suitable water-soluble materials and water-dispersible surface powder coatings, which are fully described, for example, in WO 95/06710 A1 and WO 95/30733 A1. Also polyvinylalcohol may be additionally employed as coating material, such as described in WO2018/210442.

Thus the bleaching formulation of the invention may be in the form of non-friable composition granules comprising the composition according to the first aspect of the invention, optionally with additional inert solid, bleach precursor, filler and inorganic salt, and optionally with a coating agent. Definitions and descriptions of each essential and optional class of ingredients are given in the detailed description section above.

Coating agents may comprise similar materials to the water-soluble polymers described above, but they also comprise materials such as starches, alginates, cellulose derivatives, fatty acids, waxes, paraffins, polyethylene glycols, gelating, electrolytes, polyelectrolytes.

The compositions of the first aspect of the invention, optionally in the form of a non-friable granule as described above, may be subjected to grinding, pulverising or the like so as to provide a dried composition having a desired particle size. As is well-known in the art, where such compositions are to be introduced into solid bleaching formulations, such as powders for use in laundry, agglomerated particles comprising bleach-activating catalysts are desirably of approximately the same size and bulk density as the other components of a solid bleaching formulation, so as to avoid segregation by percolation or floating.

The composition of the first aspect of the invention or a composition made therefrom is typically present in bleaching formulations according to the third aspect in a solid, generally particulate, form (for example as granules or powder), with mean particle sizes typically between 50 and 2500 μm, for example between 100 and 1600 μm. Particle sizes may be measured by a laser diffraction particle size analyser, for example a Malvern HP equipped with a 100 mm lens.

Bulk density and size of the granules can be controlled via the composition, the process condition or both, as is known in the art.

The skilled person is well acquainted with suitable particle sizes and densities (and/or can determine appropriate sizes and densities through routine experimentation), and with suitable techniques to achieve these, for example through conventional granulation techniques. For example, suitable particles may be prepared by any conventional and/or known granulation techniques, such as using a pan granulator, fluidised bed, Schugi mixer, Lödige ploughshare mixture, rotating drum and other low energy mixers; by compaction, including extrusion and tabletting optionally followed by pulverising and grinding; when melt binding agents are used by prilling and pastilling using a Sandvik Roto Former; and by high shear-energy process using a high-speed mixer/granulator equipment having both a stirring action of high energy and a cutting action. An example of a suitable compactor is equipment from Hosokawa, e.g. Bepex L200/30. Examples of such high-speed mixture/granulator equipment are the Fukae™, FS-G mixture manufactured by Fukae Powtech Kogyo Co, Japan. Other mixers usable in the process of the invention include the Diosna™, ex T.K. Fielder Ltd UK; the Fuji™ VG-C Series ex Fuji Sangyo Co. Japan; and the Roto™ ex Zanchete & Co S.r.l. Italy. Besides batch equipment, it is also possible to use a high speed mixer/granulator such as the Lödige Recycler.

The compositions according to the first aspect of the invention are of particular value when used in bleaching formulations, the transition metal ion-containing complexes described herein serving to catalyse the oxidising activity of a peroxy compound, which may either be included within a bleaching formulation according to the present invention, or may be generated from such a bleaching formulation in situ.

Where a peroxy compound is present in a bleaching formulation of the invention, this may be, and typically is, a compound which is capable of yielding hydrogen peroxide in aqueous solution. Suitable amounts of peroxy compounds included within the bleaching formulation may be determined by the skilled person although typical quantities will be within the range of 1-35 wt %, for example 5-25 wt %, based on the solids content of the bleaching formulation. One of skill in the art will appreciate that smaller quantities of peroxy compounds may be used where the bleaching formulation comprises a bleaching system (discussed below) comprising a peroxy compound and a so-called bleach precursor.

Suitable hydrogen peroxide sources are well known in the art. Examples include the alkali metal peroxides, organic peroxides such as urea peroxide, and inorganic persalts, such as alkali metal perborates, percarbonates, perphosphates, persilicates, and persulfates. Typical peroxy compounds included within bleaching formulations are persalts, for example optionally hydrated sodium perborate (e.g. sodium perborate monohydrate and sodium perborate tetrahydrate) and sodium percarbonate. According to particular embodiments, the bleaching formulation comprises sodium perborate monohydrate or sodium perborate tetrahydrate.

Inclusion of sodium perborate monohydrate is advantageous owing to its high active oxygen content. Use of sodium percarbonate is most advantageous for environmental reasons.

Organic peroxy acids may also serve as the peroxy compound. These may be mono- or diperoxyacids. Typical mono- or diperoxyacids are of the general formula HOO—(C═O)—R—Y, wherein R is an alkylene or substituted alkylene group containing from 1 to about 20 carbon atoms, optionally having an internal amide linkage or a phenylene or substituted phenylene group; and Y is hydrogen, halogen, alkyl, aryl, an imido-aromatic or non-aromatic group, a COOH or (C═O)OOH group or a quaternary ammonium group.

Typical monoperoxy acids include peroxy benzoic acids, peroxy lauric acid, N,N-phtaloylaminoperoxy caproic acid (PAP) and 6-octylamino-6-oxo-peroxyhexanoic acid. Typical diperoxy acids include for example: 1,12-diperoxydodecanoic acid (DPDA) and 1,9-diperoxyazeleic acid.

As well as organic peroxyacids, inorganic peroxyacids are also suitable, for example potassium monopersulfate (MPS).

If organic or inorganic peroxyacids are included within bleaching formulations, the amount of them incorporated in a bleaching formulation will typically be within the range of about 2-10 wt %, for example 4-8 wt %.

The bleaching formulation need not comprise a peroxy compound, however: a bleaching formulation of the invention may instead comprise a bleaching system constituted by components suitable for the generation of hydrogen peroxide in situ, but which are not themselves peroxy compounds. An example of this is the use of a combination of a $C_{1-4}$ alcohol oxidase enzyme and a $C_{1-4}$ alcohol, for example a combination of methanol oxidase and ethanol. Such combinations are described in WO 95/07972 A1 (Unilever N.V. and Unilever plc).

Often, a bleaching species is generated in situ. For example, organic peroxyacids are often generated in situ, as opposed to being included within the bleaching formulation, peroxyacids themselves tending to be insufficiently stable. For this reason, bleaching formulations often comprise a bleaching system comprising a persalt (e.g. sodium perborate (optionally hydrated) or sodium percarbonate), which yields hydrogen peroxide in water; and a so-called peroxy bleach precursor capable of reacting with the hydrogen peroxide to generate an organic peroxyacid.

The skilled person is very familiar with the use of bleaching systems comprising peroxy bleach precursors, peroxy bleach precursors being well known to the skilled person and described in the literature. For example, reference in this regard is made to British Patents 836988, 864,798, 907,356, 1,003,310 and 1,519,351; EP 0 185 522 A, EP 0 174 132 A, EP 0 120 591 A; and U.S. Pat. Nos. 1,246,339, 3,332,882, 4,128,494, 4,412,934 and 4,675,393. Suitable bleach precursors have been listed above.

Where used, bleach precursor compounds are typically present in the bleaching formulation in an amount of up to 12 wt %, for example from 2-10 wt %, of the composition, based on the solids content of the bleaching formulation Peroxy compounds or bleaching systems as described herein can be stabilised within the bleaching formulation by providing them with a protective coating, for example a coating comprising sodium metaborate and sodium silicate.

The invention also relates to a cleaning agent comprising a bleaching formulation described herein before, preferably a dishwashing agent.

Cleaning agents including dishwashing agents contain—besides the compositions of the invention—ingredients that are normally present in such agents.

In a preferred embodiment the cleaning agent according to the invention contains mononuclear or dinuclear Mn(III) and/or Mn(IV) complex defined above within the range of 0.002 and 1 wt-%, more preferred within the range of 0.005 and 0.3 wt-% and still more preferred within the range of 0.01 and 0.1 wt-%, wherein the percentages refer to the total amount of the cleaning agent.

For automatic dishwash cleaning, corrosion on glassware during the rinsing stages can be suppressed by using glass corrosion inhibitors These are, for example, crystalline layered silicates and/or zinc salts. Crystalline layered silicates are available for example from WeylChem under the trade name of Na-SKS, e.g. Na-SKS-1 ($Na_2Si_{22}O_{45}\cdot xH_2O$, kenyaite), Na-SKS-2 ($Na_2Si_{14}O_{29}\cdot xH_2O$, magadiite), Na-SKS-3 ($Na_2Si_8O_{17}\cdot xH_2O$) or Na-SKS-4 ($Na_2Si_4O_9\cdot xH_2O$, makatite). Suitable among these are in particular Na-SKS-5 (alpha-$Na_2Si_2O_5$), Na-SKS-7 (beta-$Na_2Si_2O_5$, natrosilite), Na-SKS-9 ($NaHSi_2O_5\cdot H_2O$), Na-SKS-10 ($NaHSi_2O_5\cdot 3H_2O$, kanemite), Na-SKS-11 (t-$Na_2Si_2O_5$) and Na-SKS-13 ($NaHSi_2O_5$), but in particular Na-SKS-6 (delta-Na $_2Si_2O_5$). An overview of crystalline sheet-silicates is found, for example, in the article published in "Seifen-Öle-Fette-Wachse, 116 volume, No. 20/1990", on pages 805-808.

In a further preferred embodiment of the invention, the washing and cleaning compositions of the present invention, in particular the dishwasher detergents, incorporate the crystalline layered silicate at preferably 0.1 to 20 wt %, more preferably 0.2 to 15 wt % and more preferably 0.4 to 10 wt %, all relative to the overall weight of the composition.

To control glass corrosion, washing and cleaning compositions of the present invention, in particular dishwasher detergents, may incorporate at least one zinc or bismuth salt, preferably selected from the group of organozinc salts, more preferably selected from the group of soluble organozinc salts, yet more preferably selected from the group of soluble zinc salts of monomeric or polymeric organic acids and yet still more preferably selected from the group consisting of zinc acetate, zinc acetylacetonate, zinc benzoate, zinc formate, zinc lactate, zinc gluconate, zinc oxalate, zinc ricinoleate, zinc abietate, zinc valerate and zinc p-toluenesulfonate. Bismuth salts such as, for example, bismuth acetates are employable as an alternative to or in combination with these zinc salts.

Preference in the context of the present invention is given here to washing and cleaning compositions, in particular dishwasher detergents, where the amount of zinc salt, relative to the overall weight of this composition, is from 0.1 to 10 wt %, preferably from 0.2 to 7 wt % and more preferably from 0.4 to 4 wt %, irrespective of which zinc salts are used, specifically irrespective that is as to whether organic or inorganic zinc salts, soluble or insoluble zinc salts or mixtures thereof are used.

Clearing agents of the invention may also contain silver corrosion inhibitors for silver corrosion control. Preferred silver corrosion inhibitors are organic sulfides such as cystine and cysteine, di- or trihydric phenols, optionally alkyl- or aryl-substituted triazoles such as benzotriazole, isocyanuric acid, salts and/or complexes of titanium, of zirconium, of hafnium, of cobalt or of cerium wherein the metals referred to are present in one of the oxidation states II, Ill, IV, V or VI, depending on the metal.

According to particular embodiments, bleaching formulations may be used for bleaching and/or modifying (e.g. degrading) polysaccharides (for example cellulose or starch) or polysaccharide-containing (for example cellulose-containing, also referred to herein as cellulosic) substrates. Cellulosic substrates are found widely in domestic, industrial and institutional laundry, wood-pulp, cotton processing industries and the like. For example, raw cotton (gin output) is dark brown in colour owing to the natural pigment in the plant. The cotton and textile industries recognise a need for bleaching cotton prior to its use in textiles and other areas. The object of bleaching such cotton fibres is to remove natural and adventitious impurities with the concurrent production of substantially whiter material.

Irrespective of the nature of the substrate treated in accordance with the method of the fourth aspect of the invention, it is the objective when doing so to effect bleaching, i.e. to remove unwanted chromophores (be they, for example, stains or solids on cloth in laundering or dishwashing applications; residual lignin in wood pulp or polyphenolic materials present in raw cotton and wood pulp and paper) and/or to degrade material, for example starch or polyphenolic materials in dishwashing.

According to particular embodiments, therefore, the substrate may be a dirty dish or a polysaccharide- or polysaccharide-containing substrate, for example wherein the polysaccharide is a cellulosic substrate, such as cotton, wood pulp, paper or starch.

The bleaching formulation of the present invention may thus be used in a method of dishwashing. Such a method typically involves cleaning dishes in a mechanical dishwasher, often to remove starch and polyphenolic components from the dishes' surfaces. The term "dishes" herein embraces within its scope cookware as well as plates, crockery and other eating (e.g., cutlery) and serving tableware, for example items made of ceramic, metallic or plastics materials. Accordingly, embodiments of the fourth aspect of the invention include methods of cleaning dishes in a mechanical dishwasher, which comprise contacting the dishes with water and a bleaching formulation in accordance with the third aspect of the invention.

The bleaching formulation of the present invention may likewise be used in a method of cleaning textiles or non-woven fabrics, typically textiles. By textile is meant herein a woven or knitted fabric, that is to say a fabric with interlacing fibres resultant from weaving, knotting, crocheting or knitting together natural or artificial fibres. As is known in the art, textiles are distinguished by virtue of their method of manufacture from non-woven fabrics, which are also made of fibrous material and produced through bonding achieved by application of heat, mechanical pressure or chemical (including solvent) treatment. Accordingly, embodiments of the fourth aspect of the invention include methods of cleaning textiles or non-woven fabrics, typically in a mechanical washing machine, which comprise contacting a textile or non-woven fabric with water and a bleaching formulation in accordance with the third aspect of the invention.

According to particular embodiments of the invention, the bleaching formulation is suitable for use, and may be used in, a method of cleaning textiles or non-woven fabrics, in particular for use in cleaning fabric, i.e. textiles or non-woven fabrics, for example clothes. Although it is to be understood that the invention is not to be considered to be so limited, where a bleaching formulation is intended for use in laundry or hard-surface cleaning applications, the bleaching formulation will typically comprise other components well understood by those of normal skill in the art, such as bleach stabilisers (also known as sequestrants), for example organic sequestrants such as aminophosphonate or a carboxylate sequestrants; one or more surfactants, for example cationic anionic or non-anionic (amphiphilic) surfactants; as well as other components, including (but not limited to) detergency builders, enzymes and perfuming agents.

A bleaching formulation according to the third aspect of the invention, will contain preferably between 0.1 and 50 wt-% of one or more surfactants. This bleaching formulation may comprise one or more anionic surfactants and one or more non-ionic surfactants. In general the anionic and nonionic surfactants of the surfactant system may be chosen from the surfactants described in "Surfactant Active Agents, Vol 1 by Schwartz & Perry, Interscience 1949, vol 2 by Schwartz, Perry & Berch, Interscience 1958; in the current edition of "McCutcheon's Emulsifiers and Detergents" published by Manufacturing Confectioners Company; or in Tenside Taschenbuch, H. Stache, Carl Hauser Verlag, 1981. Examples of descriptions of suitable anionic and nonionic surfactants can for example be found in WO 03/072690 A1 (Unilever N.V. et al.), WO 02/068574 A1 (Unilever N.V. et al.) and WO 2012/048951 A1 (Unilever PLC et al.)

Those knowledgeable of bleaching formulations will be familiar with the use of enzymes in this context. Enzymes can provide cleaning performance, fabric care and/or sanitation benefits. Said enzymes include oxidoreductases, transferases, hydrolases, lyases, isomerases and ligases. Members of these enzyme classes are described in Enzyme Nomenclature 1992: Recommendations of the Nomenclature Committee of the International Union of Biochemistry and Molecular Biology on the Nomenclature and Classification of Enzymes, 1992, ISBN 0-1202271165-3, Academic Press. Detersive enzymes are described in greater detail in for example U.S. Pat. No. 6,579,839 (Price et al.).

Suitable detergency builders as optional ingredients may also be present, for example as described in WO 00/34427 A1. Builders may include aluminosilicates, in particular zeolites, e.g. zeolite A, B, C, X and Y types, as well as zeolite MAP as described in EP 0 384 070 A; and precipitating builders such as sodium carbonate. Such builders are typically present in an amount from about 5 to about 80 wt-%, more preferably from about 10 to 50 wt-%, based on the solids content of the bleaching formulation.

The skilled person will be readily able to formulate a suitable bleaching formulation for use in laundry in accordance with his normal skill. Likewise, the skilled person will be readily able to formulate bleaching formulations suitable for use in the other applications described herein. Such formulations may, for example, comprise additional metal-ion based or organic catalysts suitable for catalysing the activity of the peroxy compounds described herein. Non-limiting examples of transition-metal based bleaching catalysts can be found for example in EP 2 228 429 A1 (Unilever PLC and Unilever N.V.), and references cited therein and examples of organic catalysts can be found in WO 2012/071153 A1 (The Procter & Gamble Company).

The invention also relates to a method of cleaning textiles or non-wovens or of dishwashing comprising contacting a substrate with water and a bleaching formulation as defined above.

Preferred is a method of cleaning dishes in a mechanical dishwasher, the method comprising contacting the dishes with water and the bleaching formulation.

The non-limiting examples below more fully illustrate the embodiments of this invention.

EXPERIMENTAL

Chemicals Used.

Corn starch was obtained from Roth.

TAED (Peractive® AC White), Weylclean® FDO X and Weylclean® FDO XP were obtained from Weylchem Performance Products. Weylclean® FDO X and Weylclean® FDO XP are granules each containing 2 wt-% of $[Mn^{IV}Mn^{IV}(\mu\text{-}O)_3(Me_3\text{-}TACN)_2](PF_6)_2\cdot H_2O$. Weylclean® FDO X are uncoated granules and Weylclean® FDO XP are coated granules.

Calcium sulfate was obtained from Rettenmaier under the tradename COMPACTROL®.

Polyvinyl alcohol was obtained from Kuraray, under the trade name Poval® 6-88.

Trisodium citrate was obtained from Jungbunzlauer.

Sodium carbonate was obtained from Sigma Aldrich.

Sodium percarbonate was obtained from Solvay.

SKS-6 silicate was obtained from Weylchem Performance products under the tradename Weylclean® SKS-6.

PEG 1500 and PEG 6000 powder were obtained from Clariant.

Sokalan® PA25 Cl and Lutensol T07 were obtained from BASF.

Protease Blaze Evity 150T and Amylase Stainzyme Plus Evity 24T were obtained from Novozymes.

$[Mn_2(\mu\text{-}O)_3(Me_3TACN)_2]SO_4$ (as a 15 wt-% aqueous solution) was prepared as described in WO2006/125517 (abbreviated below as $MnTACNSO_4$).

$[Mn_2(\mu\text{-}O)_3(Me_3TACN)_2](NO_3)_2$ (as a 14 wt-% aqueous solution) was prepared in a similar fashion as $[Mn_2(\mu\text{-}O)_3(Me_3TACN)_2]SO_4$ solution as described in WO2006/125517.

$[Mn_2(\mu\text{-}O)_2(\mu\text{-}CH_3COO)(Me_4DTNE)]Cl_2$ (50% purity level after spray drying with NaCl added) was prepared as disclosed in WO 2013/033864.

$[Mn_2(\mu\text{-}O)_3(Me_3\text{-}TACN)_2](PF_6)_2 \cdot H_2O$ used as obtained from Weylchem Performance Products, under the tradename Weylclean® MnTACN.

Preparation of Granules and ADW Tablets.

Seven compositions of granules containing $MnTACNSO_4$ were prepared, according to table 1. A typical recipe to prepare the granules according to the table below is as follows (example given for granule 1).

First an aqueous PVOH solution is prepared, according to the information given by Kururay. The commercial Poval 6-88 polymer was dissolved in 3 weight equivalent of hot water (90-95° C.) and then slowly allowed to cool down.

In an Eirich laboratory mixer (Type R02), 536 g of TAED and 400 g of corn starch were added and mixed thoroughly. Then, the aqueous solution of $MnTACNSO_4$ and PVOH were quickly added to the TAED/starch mixture. For granules 3, 6 and 7, no TAED was used, instead the inorganic salt $CaSO_4$ was used. For granule 7, instead of starch, a microcrystalline cellulose (Heweten® 101) was used. The amount of $MnTACNSO_4$ solution (15 wt-%) added was 133.3 g for granules 1-3, 200 g for granules 4-6 and 400 g for granule 7. The amount of diluted PVOH (Poval 6-88; 25 wt-% in water) added was 174 g for granules 1-3, 98.5 g for granules 4-6 and 64 g for granule 7. The resulting composition was then further mixed thoroughly for 2 min (2500 rpm). Then the granules were dried as a fluidized bed (30 min at 60° C.). The dried granules obtained were sieved; fines (<0.2 mm) and course granules (>1.6 mm) were discarded (or could be re-used to prepare new granules of the right size.

TABLE 2-continued

Composition of the ingredients to prepare ADW tablets comprising granules 1-7 shown in table 1.

| Ingredient | Wt-% |
|---|---|
| Sodium percarbonate | 15.0 |
| Peractive AC white (TAED) | 5.0* |
| Weylclean SKS-6 | 5.0 |
| PEG 1500 Powder | 3.0 |
| PEG 6000 Powder | 2.0 |
| Sokalan PA25 CI | 5.0 |
| Lutensol TO7 | 1.0 |
| Protease Blaze Evity 150T | 1.5 |
| Amylase Stainzyme Plus Evity 24T | 0.5 |

*The appropriate amount of TAED was added to obtain in total 5% TAED in the ADW tablet. As also TAED was introduced by adding the granules 1, 2, 4 and 5, but not in granules 3, 6 and 7, different amounts of pure TAED was added to the mix.

Tea-Stain Cleaning in ADW

The ADW tablets comprising the granules 1-7 were then tested for tea-stain removal of tea cups in an automatic dishwasher (Miele G 1223 SC GSL2—45° C., standard programme R-time 2, at 21° DH water hardness, with 50 g of IKW soil—protocol).

The cleaning on tea-stained cups was for all tablets containing granules 1-7, 10 on a scale of 1-10.

The blank (no catalyst present) showed a performance of 4.8 on the same scale and two reference samples (same composition of the ADW formulation, but now added as commercial granules without coating (Weylclean® FDO X) and one with coating, (Weylclean® FDO XP), showed both a cleaning performance of 10.

These results show that the cleaning performance of the ADW tablets comprising granules containing $MnTACNSO_4$ according to this invention is very good and the same as the ADW formulation containing the commercial FDO X and FDO XP granules.

TABLE 1

Composition (in wt-% dry matter) of the granules comprising $MnTACNSO_4$, TAED, starch or microcrystalline cellulose (Heweten ® 101) and polyvinyl alcohol (Poval ® 6-88). Each of the granules were prepared on 1 kg batch scale.

| | Granule 1 | Granule 2 | Granule 3 | Granule 4 | Granule 5 | Granule 6 | Granule 7 |
|---|---|---|---|---|---|---|---|
| TAED | 53.6 | 43.6 | 0 | 54.5 | 44.5 | 0 | 0 |
| $CaSO_4$ | 0 | 0 | 53.6 | 0 | 0 | 54.5 | 52.9 |
| Corn starch | 40.0 | 50.0 | 40.0 | 40.0 | 50.0 | 40.0 | 0 |
| Microcrystalline cellulose | 0 | 0 | 0 | 0 | 0 | 0 | 39.6 |
| $MnTACNSO_4$ | 2.0 | 2.0 | 2.0 | 3.0 | 3.0 | 3.0 | 6.0 |
| Poval 6-88 | 4.4 | 4.4 | 4.4 | 2.5 | 2.5 | 2.5 | 1.6 |

The composition of the ADW formulation to which the granules comprising the manganese catalyst are added is given in table 2 below.

Each of the granules (80.15 mg for granules 1-3, 53.44 mg for granules 4-6 and 26.72 mg for granule 7), were then brought into a vessel that contained 19.8 g of the ingredients as indicated in the table below and this was mixed well. Tablets of 19.88 g (granules 1-3), 19.85 g (granules 4-6) and 19.83 g (granule 7) each were then prepared by using a Carver Handtablettenpresse Model 4332 using a 1.5 ton press force.

TABLE 2

Composition of the ingredients to prepare ADW tablets comprising granules 1-7 shown in table 1.

| Ingredient | Wt-% |
|---|---|
| Sodium citrate | 36.0 |
| Sodium carbonate | 25.0 |

Storage Stability Test Results

The tablets containing $MnTACNSO_4$ were then stored in an oven at 40° C. during 4 weeks and were then both tested for the cleaning performance and visually assessed (colour changes of the tablets). Comparison was made again with the same ADW tablets comprising Weylclean® FDO X and Weylclean® FDO XP commercial granules (which contain each 2-wt % of $[Mn^{IV}Mn^{IV}(\mu\text{-}O)_3(Me_3\text{-}TACN)_2](PF_6)_2 \cdot H_2O$).

The dishwash tablets containing granules 1, 2, 3, 4 and 5 did not show any change in colour during storage, whilst the tablets containing granules 6 and 7 showed brown spots in the tablets (presumably due to degraded MnTACN catalyst).

Under the same conditions the tablets containing the commercial Weylclean® FDO X granules (containing crystals of $[Mn^{IV}Mn^{IV}(\mu\text{-}O)_3(Me_3\text{-}TACN)_2](PF_6)_2 \cdot H_2O$)

showed dark spots of (presumably) $MnO_2$. Also, the tablets containing the coated Weylclean® FDO XP granules, which also contain crystals of $[Mn^{IV}Mn^{IV}(\mu\text{-}O)_3(Me_3\text{-}TACN)_2](PF_6)_2 \cdot H_2O$, showed some dark spots (but less than for the tablets with Weylclean® FDO X granules).

The tea-stain bleaching performance using the same set-up as described in the preceding section showed that the tablets containing granules 1, 2, 4, 5 and 7 gave the same high tea-stain performance as the freshly prepared tablets/granules. The tablets with granule 3 showed a loss of 15% activity and that of granule 6, showed a loss of 5% activity.

The reference tablet with Weylclean® FDO X showed a diminished activity by 20%, suggesting significant decomposition of the catalyst and/or sodium percarbonate during storage.

These data showed clearly that granules comprising $MnTACNSO_4$ show very good stability and bleaching activity in ADW formulations. Surprisingly, the results of the storage tests of the uncoated granules comprising amorphous $MnTACNSO_4$ in the ADW tablets are even better than that of the coated commercial MnTACN catalyst with $PF_6$ as non-coordinating counterion (Weylclean® FDO XP), as the latter showed brown spotting after storage.

Reference Granulation Experiments

Attempts to make granules according to the same processing by using an aqueous solution of $[Mn_2(\mu\text{-}O)_3(Me_3TACN)_2](PF_6)_2 \cdot H_2O$.

Similar to the process described above for granules 1-7, an aqueous solution of $[Mn_2(\mu\text{-}O)_3(Me_3TACN)_2](PF_6)_2 \cdot H_2O$ in water and PVOH were mixed together with the other components to make the granule (corn starch and $CaSO_4$). As the solubility of $[Mn_2(\mu\text{-}O)_3(Me_3TACN)_2](PF_6)_2 \cdot H_2O$ in water is relatively low (1.08 wt-% in water at 20° C. —see WO2006/125517), a large amount of water needed to be added to obtain a mixture that has enough of the $[Mn_2(\mu\text{-}O)_3(Me_3TACN)_2](PF_6)_2 \cdot H_2O$ catalyst to yield a granule comprising 2 wt-% of $[Mn_2(\mu\text{-}O)_3(Me_3TACN)_2](PF_6)_2 \cdot H_2O$ (this would equate to 1.85 L of the aqueous solution of $[Mn_2(\mu\text{-}O)_3(Me_3TACN)_2](PF_6)_2 \cdot H_2O$ following the same amounts of chemicals as described in the examples above).

Two observations were made: first it proved to be impossible to dry the mixture obtained without significantly decomposing the catalyst during the fluidised bed drying process. After drying, dark brown granules were obtained that are not suitable to be applied in dishwash deterrent formulations. Second observation was that the mixture of the $[Mn_2(\mu\text{-}O)_3(Me_3TACN)_2](PF_6)_2 \cdot H_2O$ and PVOH in water was not stable.

Leaving the mixture at room temperature for one day showed a white precipitation and a colourless solution. This did not occur when mixing a solution of $MnTACNSO_4$ and PVOH, where the mixture in the solution remained stable for at least 4 days.

Attempting to use the same amount of water as described above for $MnTACNSO_4$ (20 g $[Mn_2(\mu\text{-}O)_3(Me_3TACN)_2](PF_6)_2 \cdot H_2O$ in 133 g water) led to a mixture of dissolved manganese catalyst (1.08 wt-% or 1.45 g) and 18.55 g remained as crystalline product (as a slurry). Granulation and drying of this mixture together with PVOH, starch and $CaSO_4$ or TAED will lead to granules in which the catalyst is present mainly as of crystalline solid material, which will have very different appearances and will need to be coated to obtain stable granules (like the commercial coated Weylclean® FDO XP granules). As shown, such granules are much darker of appearance and as such quite different from the granules according to the procedures described for granules 1-7 above.

Scanning Electron Microscope) Analysis of Granules Comprising $MnTACNSO_4$

In FIGS. 1 to 6 SEM (scanning electron microscope) pictures of non-coated granules of the present invention are illustrated. FIG. 1 shows a picture of a granule prepared from a formulation of granule 4 of table 1. FIGS. 2 to 6 show enlarged portions of this granule.

In FIG. 1 a granule comprising primary particles with a smooth surface is observed. No $MnTACNSO_4$ crystals can be detected in these figures. When expanding the magnification as shown in FIGS. 2 to 6 clearly smaller spheres are observed which are no crystals. At the highest magnification in FIGS. 5 and 6 one observes the small spheres with some amorphous material glued on it. But there is never any indication for crystals.

This is comprehensible from a chemical point of view. During preparation of the granules a solution of $MnTACNSO_4$ and PVOH was used in combination with starch, which absorbs the water. After mixing of the ingredients the resulting granules are dried relatively quickly (30 minutes). As usually during a drying process to obtain crystalline transition-metal complexes takes many hours or days, it is understandable that in the fast drying process of the granules there is no possibility to form crystalline bleaching catalyst within the granule, especially considering that the highly water soluble catalyst salts will make crystallisation more difficult than when using low water soluble catalyst salts, as disclosed in WO2006/125517.

Preparation of Granules Comprising $[Mn_2(\mu\text{-}O)_3(Me_3TACN)_2](NO_3)_2$

Similarly to the procedure outlined above for the granules comprising $[Mn_2(\mu\text{-}O)_3(Me_3TACN)_2]SO_4$, granules were prepared comprising TAED, corn starch and PVOH (granule 8). The composition of red granule 8 is: 53.6 wt-% TAED, 4.4 wt-% PVOH, 40.0 wt-% corn starch and 2.0 wt-% of $[Mn_2(\mu\text{-}O)_3(Me_3TACN)_2](NO_3)_2$.

Preparation of ADW Tablets Comprising Granules Comprising $[Mn_2(\mu\text{-}O)_3(Me_3TACN)_2](NO_3)_2$.

Next tablets were pressed according to the procedure described above using the composition given in Table 2 above, which included also 79.5 mg of the granule 8 comprising $[Mn_2(\mu\text{-}O)_3(Me_3TACN)_2](NO_3)_2$.

Determination Bleaching Activity in ADW.

Tea stain cleaning of tea cups in a dishwasher as described above for the tablets comprising granules 1-7, has been carried out for the tablets comprising granule 8 with $[Mn_2(\mu\text{-}O)_3(Me_3TACN)_2](NO_3)_2$.

A complete stain removal has been observed, similarly to the other tablets comprising granules 1-7, showing that the cleaning activity of the tablets containing granule 8 is equivalent to those comprising granules 1-7 or the commercial FDO X granules (comprising $[Mn_2(\mu\text{-}O)_3(Me_3TACN)_2](PF_6)_2$).

Storage Stability Tests

Next the tablets were stored at 40° C. for 4 weeks and then the tea-stain bleaching activity was again assessed. No loss in performance was observed (complete cleaning), showing that the granule 8 in the ADW tablets is also very stable (like observed for the granules 1-7 comprising $MnTACNSO_4$ stored in the ADW tablets as disclosed above.

Preparation of Granules Comprising $[Mn_2(\mu\text{-}O)_2(—CH_3COO)(Me_4DTNE)]Cl_2$.

Similarly to the procedure outlined above for the granules comprising $[Mn_2(\mu\text{-}O)_3(Me_3TACN)_2]SO_4$, granules were prepared comprising $[Mn_2(\mu\text{-}O)_2(\mu\text{-}CH_3COO)(Me_4DTNE)]Cl_2$, TAED, corn starch and PVOH (granule 9).

The composition of granule 9 is: 53.6 wt-% TAED, 4.4 wt-% PVOH, 40.0 wt-% corn starch, 1.0 wt-% of NaCl and 1.0 wt-% of $[Mn_2(\mu\text{-}O)_2(\mu\text{-}CH_3COO)(Me_4DTNE)]Cl_2$. The colour of the granules 9 is pale green.

Determination Bleaching Activity of Granule 9.

BC-1 (tea stain on cotton) bleaching experiments were carried similarly as described in WO2014/202954. All bleaching experiments were done in duplication.

BC-1 (tea stain on cotton) bleaching was assessed at pH 11.5 in an aqueous solution containing 1 g/L nonionic formulation (Lutensol A07), 0, 1 and 2 μM $[Mn_2(\mu\text{-}O)_2(\mu\text{-}CH_3COO)(Me_4DTNE)]Cl_2)$, 1 g/L sodium percarbonate at 40° C. for 30 min (reference test).

Similarly, the bleaching activity of granule 9 was assessed using the same protocol, except for dissolving granule 9 in demineralised water yielding the same concentrations of catalyst as used in the reference test.

Results

In the table 3 below it can be seen that the bleaching performance of the granule 9 containing $[Mn_2(\mu\text{-}O)_2(\text{—}CH_3COO)(Me_4DTNE)]Cl_2$ is very similar to that of the 50% pure $[Mn_2(\mu\text{-}O)_2(\mu\text{-}CH_3COO)(Me_4DTNE)]Cl_2$, showing that the granules comprising this catalyst (granule 9) release the catalyst efficiently in the bleaching solution leading to the same tea stain bleaching performance as for the pure catalyst.

TABLE 3

ΔR* BC-1 (tea stain on cotton) bleaching at pH 11.5, 1 g/L sodium percarbonate at 40° C. for 30 min and various amounts of $[Mn_2(\mu\text{-}O)_2(\mu\text{-}CH_3COO)(Me_4DTNE)]Cl_2$ catalyst (a higher ΔR* number indicates a higher reflectance at 457 nm and therefore a better bleaching result).

| Concentration $[Mn_2(\mu\text{-}O)_2(\mu\text{-}CH_3COO)(Me_4DTNE)]Cl_2$ (μM) | Catalyst dosed as 50% pure compound ΔR* | Granule 9 dosed ΔR* |
|---|---|---|
| 0 | 17.7 (1.0) | 17.7 (1.0) |
| 1.0 | 25.2 (0.1) | 24.2 (0.1) |
| 2.0 | 26.3 (0.1) | 25.8 (0.1) |

Determination Storage Stability of Granule 9

Storage stability of the granules 9 was determined by keeping the granules 9 in a jar at 40° C. for 2 months, after which the BC-1 (tea stain) bleaching activity was measured as described above for the freshly prepared granules comprising $[Mn_2(\mu\text{-}O)_2(\mu\text{-}CH_3COO)(Me_4DTNE)]Cl_2$ (granule 9).

Results showed that the bleaching performance of granule 9 comprising $[Mn_2(\mu\text{-}O)_2(\mu\text{-}CH_3COO)(Me_4DTNE)]Cl_2$ after storage for 2 months at 40° C. is similar to that of the freshly prepared granules. So

TABLE 4

ΔR* BC-1 (tea stain on cotton) bleaching at pH 11.5, 1 g/L sodium percarbonate at 40° C. for 30 min and various amounts of $[Mn_2(\mu\text{-}O)_2(\mu\text{-}CH_3COO)(Me_4DTNE)]Cl_2$ catalyst dosed in granule 9 freshly prepared and after storage for 2 months at 40° C.

| Concentration $[Mn_2(\mu\text{-}O)_2(\mu\text{-}CH_3COO)(Me_4DTNE)]Cl_2$ (μM) | Granule 9 (fresh) ΔR* | Granule 9 after 2 months storage at 40° C. ΔR* |
|---|---|---|
| 0 | 22.9 (0.7) | 22.9 (0.7) |
| 0.5 | 25.6 (0.1) | 25.7 (0.1) |
| 1.0 | 27.6 (0.6) | 25.4 (0.5) |
| 2.0 | 28.5 0.1) | 28.0 (0.5) |

The invention claimed is:

1. A composition containing a water-soluble polymer selected from the group consisting of polyvinylalcohol or modified polyvinylalcohol, a polysaccharide absorbent selected from the group consisting of starch or modified starch, a water soluble transition metal ion containing bleaching catalyst, wherein the water-soluble transition metal ion containing bleaching catalyst has a water solubility of at least 30 g/L at 20° C. and is a dinuclear Mn(III) and/or Mn(IV) complex selected from the group consisting of $[Mn^{IV}_2(\mu\text{-}O)_3(Me_3TACN)_2]SO_4$, $[Mn^{IV}_2(\mu\text{-}O)_3(Me_3TACN)_2](NO_3)_2$, $[Mn^{IV}_2(\mu\text{-}O)_3(Me_3TACN)_2](CH_3COO)_2$, $[Mn^{IV}_2(\mu\text{-}O)_3(Me_3TACN)_2](benzoate)_2$, $[Mn^{III}Mn^{IV}(\mu\text{-}O)_2(\mu\text{-}CH_3COO)(Me_4DTNE)]Cl_2$, $[Mn^{III}Mn^{IV}(\mu\text{-}O)_2(\mu\text{-}CH_3COO)(Me_4DTNE)]SO_4$, $[Mn^{III}Mn^{IV}(\mu\text{-}O)_2(\mu\text{-}CH_3COO)(Me_4DTNE)](NO_3)_2$ or $[Mn^{III}Mn^{IV}(\mu\text{-}O)_2(\mu\text{-}CH_3COO)(Me_4DTNE)](CH_3COO)_2$, wherein $Me_3TACN$ denotes 1,4,7-trimethyl-1,4,7-triazacyclononane and $Me_4DTNE$ denotes (1,2-bis(4,7-dimethyl-1,4,7-triazacyclononan-1-yl)ethane, and 20 to 80 wt % of a bleaching activator selected from the group consisting of tetraacetylethylene diamine, n-nonanoyloxibenzenesulfonate, glycerol triacetate (triacetin) or decanoyloxibenzoic acid, where the percentage refers to the total weight of the composition;

wherein the water soluble transition metal ion containing bleaching catalyst is present in the composition in an amorphous or nanocrystalline form.

2. The composition according to claim 1, wherein the water-soluble transition metal ion-containing bleaching catalyst is selected from the group consisting of $[Mn^{IV}_2(\mu\text{-}O)_3(Me_3TACN)_2]SO_4$, $[Mn^{IV}_2(\mu\text{-}O)_3(Me_3TACN)_2](NO_3)_2$, and $[Mn^{III}Mn^{IV}(\mu\text{-}O)_2(\mu\text{-}CH_3COO)(Me_4DTNE)]Cl_2$.

3. The composition according to claim 1, wherein the water-soluble polymer is polyvinylalcohol and the polysaccharide absorbent is starch.

4. The composition of claim 1, wherein the composition comprises between 5 and 75 wt-%, referring to the total amount of the composition, of the absorbent.

5. The composition of claim 1, wherein the polysaccharide absorbent is selected from the group consisting of potato starch, maize starch, rice starch, wheat starch, partially pregellatinised starches from the aforementioned list, and dextrin.

6. The composition of claim 1, wherein the composition comprises an organic filler different from the absorbent or an inorganic filler, or a mixture thereof, in an amount of up to 85 wt-%, referring to the total amount of the composition, and/or wherein the composition comprises a salt selected from the group consisting of alkali metal salt, alkali earth metal salt, transition-metal salts of bicarbonates, carbonates, halides, sulfates, phosphates, oxides, acetates, citrates or nitrates.

7. The composition of claim 1, wherein the composition is a granule which optionally contains a coating.

8. The composition of claim 1 which contains:

0.1-25 wt-% of the dinuclear Mn(III) and/or Mn(IV) complex;

0.1-20 wt-% of the water-soluble polymer;

5-75 wt-% of the polysaccharide absorbent;

0-85 wt-% of a filler different from the absorbent;

0-85 wt-% of a salt selected from the group consisting of alkali metal salts, alkali earth metal salts, transition-metal salts of bicarbonates, carbonates, halides, sulfates, phosphates, oxides, acetates, citrates or nitrates; and 20 to 70 wt-% of the bleaching activator, wherein the percentages refer to the total amount of the composition.

9. The composition of claim 1, wherein the dinuclear Mn(III) and/or Mn(IV) complex is selected from the group consisting of $[Mn^{IV}_2(\mu\text{-}O)_3(Me_3TACN)_2]SO_4$, $[Mn^{IV}_2(\mu\text{-}O)_3(Me_3TACN)_2](NO_3)_2$, and $[Mn^{III}Mn^{IV}(\mu\text{-}O)_2(\mu\text{-}CH_3COO)(Me_4DTNE)]Cl_2$;

the water-soluble polymer is polyvinylalcohol;

polysaccharide absorbent is starch; and the bleaching activator is tetraacetylethylene diamine.

10. A method of manufacturing the composition according to claim 1, said method comprising a) providing in a mixing device the water-soluble polymer, the polysaccharide absorbent, the bleaching activator, and a solution comprising between 2 and 75 wt-%, referring to the total amount of the solution, of the water-soluble transition metal ion containing bleaching catalyst, b) mixing the ingredients resulting from step a);

c) forming particles or extrude from said mixed ingredients, and d) optionally drying the composition the particles or extrudate resulting from step c) to form the composition.

11. The method of claim 10, wherein the composition comprises between 0.1 and 20 wt-%, referring to the total amount of the composition, of the water-soluble polymer and wherein the water-soluble polymer is added as an aqueous solution in step a), and wherein the concentration of the water-soluble polymer is between 5 and 50 wt-%, referring to the aqueous solution of the water-soluble polymer.

12. A bleaching formulation comprising the composition of claim 1 and a peroxy compound and/or a precursor thereof.

13. A cleaning agent comprising the composition of claim 1, which cleaning agent is a dishwashing agent.

14. A method of cleaning textiles or non-woven fabrics or of dishwashing, the method comprising contacting a substrate with water and the cleaning agent of claim 13.

* * * * *